(12) United States Patent
Gyoten et al.

(10) Patent No.: US 6,746,793 B1
(45) Date of Patent: Jun. 8, 2004

(54) POLYMER ELECTROLYTE FUEL CELL

(75) Inventors: Hisaaki Gyoten, Shijonawate (JP); Eiichi Yasumoto, Katano (JP); Kazuhito Hatoh, Osaka (JP); Makoto Uchida, Hirakata (JP); Yasushi Sugawara, Settsu (JP); Teruhisa Kanbara, Ikeda (JP); Junji Morita, Moriguchi (JP); Hideo Ohara, Katano (JP); Kazufumi Nishida, Moriguchi (JP); Osamu Sakai, Neyagawa (JP); Yukiyoshi Ono, Hirakata (JP); Yasuo Takebe, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,664

(22) PCT Filed: Jun. 10, 1999

(86) PCT No.: PCT/JP99/03123

§ 371 (c)(1),
(2), (4) Date: Dec. 15, 2000

(87) PCT Pub. No.: WO99/66578

PCT Pub. Date: Dec. 23, 1999

(30) Foreign Application Priority Data

Jun. 16, 1998 (JP) ............................................. 10-168174
Oct. 13, 1998 (JP) ............................................. 10-290340
Feb. 5, 1999 (JP) ............................................. 11-028245
Feb. 19, 1999 (JP) ............................................. 11-041184

(51) Int. Cl.$^7$ ............................. H01M 8/02; H01M 8/10
(52) U.S. Cl. ............................. 429/40; 429/30; 429/41
(58) Field of Search .............................. 429/30, 31, 32, 429/33, 34, 41, 42

(56) References Cited

U.S. PATENT DOCUMENTS

| | | | |
|---|---|---|---|
| 4,826,554 A | 5/1989 | McIntyre et al. | |
| 5,211,984 A | 5/1993 | Wilson | |
| 5,272,017 A | * 12/1993 | Swathirajan et al. | .......... 429/33 |

FOREIGN PATENT DOCUMENTS

| | | |
|---|---|---|
| JP | 61-295387 | 12/1986 |
| JP | 61-295388 | 12/1986 |
| JP | 62-196389 | 8/1987 |
| JP | 62-208553 A | 9/1987 |
| JP | 64-062489 | 3/1989 |
| JP | 1-286256 | 11/1989 |
| JP | 03-184266 | 8/1991 |
| JP | 03-295172 | 12/1991 |
| JP | 04-264367 | 9/1992 |
| JP | 05-036418 | 2/1993 |
| JP | 5-325983 | 12/1993 |
| JP | 06-052871 | 2/1994 |
| JP | 7-282814 | 10/1995 |
| JP | 07-296818 A | 11/1995 |
| JP | 8-88008 | 4/1996 |
| JP | 09-245801 | 9/1997 |
| JP | 09-265992 | 10/1997 |

OTHER PUBLICATIONS

JPO web site translation of JP 09–265992–A.*

* cited by examiner

*Primary Examiner*—Gregg Cantelmo
(74) *Attorney, Agent, or Firm*—Akin Gump Strauss Hauer & Feld, LLP

(57) ABSTRACT

The polymer electrolyte fuel cell of the present invention exhibits an excellent performance with an efficient electrode reaction; by providing a layer comprising an electroconductive fine particle between the catalytic reaction layer and the gas diffusion layer in the electrodes; by providing a hydrogen ion diffusion layer on at least either surface of the catalyst particle or the carrier, which carries the catalyst particle in the catalytic reaction layer; or by constituting the catalytic reaction layer with at least a catalyst comprising a hydrophilic carbon material with catalyst particles carried thereon and a water repellent carbon material.

12 Claims, 15 Drawing Sheets

POLYMER ELECTROLYTE FUEL CELL

BACKGROUND OF THE INVENTION

1. Technical Field

The present invention relates to a fuel cell comprising a polymer electrolyte for use in portable power sources, power sources for electric vehicles, cogeneration systems for home and the like and a method for producing the same. More specifically, the present invention relates to an electrode for a fuel cell.

2. Background Art

A fuel cell using a polymer electrolyte is an electrochemical device for generating electric power and heat at the same time by electrochemically reacting a fuel gas containing hydrogen with an oxidant gas containing oxygen such as air.

In constructing such a fuel cell, first, catalytic reaction layers mainly composed of a carbon powder with a platinum group metallic catalyst carried thereon are formed on both sides of a polymer electrolyte membrane which transfers selectively a hydrogen ion. Next, on the outer surfaces of the catalyst layers, a pair of gas diffusion layers having both fuel gas permeability and electronic conductivity are formed, and each electrode is formed in combining one of the gas diffusion layers with one of the catalytic reaction layers. Thus, the electrodes and the polymer electrolyte membrane are primarily configured in one unit. This is called membrane electrode assembly (hereinafter, this is also referred to as "MEA"). In order to avoid leaking outside of supplied fuel gas or oxidant gas, or mixing of the two kinds of gases together, a gas seal material or a gasket is placed in the circumference of the electrodes so that they sandwich the polymer electrolyte membrane. Then, a large number of MEA's are laminated with electroconductive separator plates interposed between each thereof, and thereby a fuel cell as so-called laminated cell is configured.

Next, the catalytic reaction layers in the electrodes of the fuel cell will be described. The carbon powder with metallic catalyst carried thereon is in the form of particle falling in the range of several hundred angstroms to several microns. By using a mixture of this carbon powder and a dispersion of a polymer electrolyte, a catalytic reaction layer having a thickness of 30 to 100 microns is formed between the electrode and the solid electrolyte membrane by a coating process such as printing or the like. In this catalytic reaction layers, electrochemical reaction of the fuel gas and the oxidant gas proceeds.

For example, in the anode where hydrogen reacts, hydrogen gas is supplied to the electrode surface through a fuel gas supply path notched in the separator plate. The electrode is usually made of a gas-permeable electroconductive material such as carbon paper or carbon cloth, and hydrogen gas can reach the catalytic reaction layer by permeating the electrode. Onto the surface of the catalyst carrying carbon powder, a polymer electrolyte formed with a dried and solidified solution of the polymer electrolyte adheres. In a so-called three phase zone constituted by a vapor phase containing hydrogen gas, a solid phase of the catalyst carrying carbon powder, and a phase of the polymer electrolyte, all of which being close to each other, the hydrogen gas is oxidized to become hydrogen ions and is discharged into the polymer electrolyte. The electron generated by oxidation of the hydrogen gas moves to an outside electric circuit passing through the electroconductive carbon powder. This electrochemical reaction progresses in a broader area because of the hydrogen gas dissolved in the polymer electrolyte. The thickness of the catalytic reaction layer is varied according the production process thereof; however, in order to obtain a good cell performance, the catalytic reaction layer is usually designed to have a thickness of 30 to 100 microns.

(1) Utilization Rate of the Catalyst in the Catalytic Reaction Layer

Within the catalytic reaction layer, however, the area which contributes to the actual electrode reaction is considered only a part of 20 microns thick in contact with the polymer electrolyte membrane. This is because the generated hydrogen ion has a difficulty in reaching the polymer electrolyte membrane. Also, in the condition where the catalyst carrying carbon powder is not in electrical contact with other carbon powder or with the electroconductive electrode, although the hydrogen ion can easily move, the electron is prevented from moving to the outside circuit. As a result, there has been a problem that the catalytic reaction layer formed by coating comes to the state where a large part thereof does not contribute to the electrode reaction, which impairs its performance, and therefore a large quantity of platinum is needed for recovering its performance.

As a consequence, it is desired to improve the catalytic reaction layer and make the platinum catalyst effectively contribute to the electrode reaction, thereby to improve the utilization rate of the platinum catalyst.

(2) Contact Resistance Between the Catalytic Reaction Layer and the Gas Diffusion Layer The electrode for use in the polymer electrolyte fuel cell is produced by forming catalytic reaction layer comprising a noble metal carrying carbon powder on electroconductive porous electrode supporting material serving as gas diffusion layer. As the porous electroconductive supporting material, a carbon paper, a carbon cloth or the like made of carbon fiber or the like is used. These electrodes are generally formed on the supporting materials by means of screen printing process or transcription process with a noble metal carrying carbon fine powder prepared into an ink using an organic solvent such as isopropyl alcohol.

In recent years, in the viewpoint of workability, inks for electrodes using aqueous solvents in place of organic solvents have been proposed. However, when these methods are used, a part of the noble metal carrying carbon powder serving as the catalyst in the electrode penetrates into the electrode supporting material, which constitutes the gas diffusion layer. For this reason, measures are required such as using a relatively large amount of electrode catalyst, or maintaining electroconductivity in the contact surface between the gas diffusion layer and the catalytic reaction layer by increasing cramping pressure of the cell. Alternatively, a method in which the electrode catalyst layers are primarily applied and formed on the polymer electrolyte membrane has been proposed. These electrodes and the polymer electrolyte membrane are bound to each other by means of hot-pressing or the like.

As described above, in the polymer electrolyte fuel cell, it is strongly required not only to increase the utilization rate of the catalyst in the catalytic reaction layer but also to decrease the contact resistance between the carbon paper or the carbon cloth, which constitutes the gas diffusion layers, and the catalytic reaction layers.

(3) Reaction Efficiency Between the Polymer Electrolyte and the Catalyst

In the electrode as constituent of a polymer electrolyte fuel cell, the surface area of a so-called three phase zone, which is formed by a micropore serving as a supply path for the reaction gases (fuel gas and oxidant gas), the hydrogen ion conductive polymer electrolyte, and the electronic conductive electrode supporting material, is an important factor, which influences the discharge characteristic of the cell.

Conventionally, with an aim to enlarge this three phase zone, attempts have been made to provide, on the interface between the polymer electrolyte membrane and the porous electrode supporting material, a layer comprising a material which constitute the electrode supporting material and the polymer electrolyte, mixed with each other and dispersed. For example, in the technique described in Japanese Patent Publications No. Sho 62-61118 and Japanese Patent Publication No. Sho 62-61119, a method is disclosed in which a mixture of a polymer electrolyte dispersion and a catalyst compound is applied on the polymer electrolyte membrane, and this is hot-pressed with the electrode supporting material and subsequently the catalyst compound is reduced. Also suggested is a method in which, after a catalyst compound is reduced, this is applied onto an electrolyte membrane and hot-pressed.

Further disclosed in Japanese Patent Publication No. Hei 2-48632 is a method in which, after porous electrode supporting material is molded, a solution containing a dispersed resin, which constitutes an ion exchange membrane, is sprinkled onto the electrode supporting material and these electrode and the ion exchange membrane are hot-pressed. Still further, a powder comprising a polymer resin powder with a polymer electrolyte applied on the surface thereof is proposed in Japanese Laid-Open Patent Publication No. Hei 3-184266 and a method of mixing a powder of a polymer electrolyte into the electrode is proposed in Japanese Laid-Open Patent Publication No. Hei 3-295172, respectively. Moreover, a method of mixing a polymer electrolyte, a catalyst, a carbon powder, and a fluorocarbon resin and forming them into a membrane for use as the electrode is disclosed in Japanese Laid-Open Patent Publication No. Hei 5-36148. In the above techniques, alcohol is used as a solution for forming a polymer electrolyte in the electrode.

Also disclosed in U.S. Pat. No. 5,211,984 is a method of preparing a dispersion in the form of an ink by dispersing a polymer electrolyte, a catalyst and a carbon powder in glycerin or tetrabutyl ammonium salt as a solvent, applying and forming the dispersion on a film made of polytetrafluoroethylene (hereinafter, this is referred to as "PTFE") and subsequently transcribing this film onto the polymer electrolyte membrane surface. Further reported is a method of replacing an exchange group of the polymer electrolyte membrane with a substituent group of Na type, applying the ink-like dispersion as described above onto the surface of this membrane, heating and drying the same at a temperature of 125° C. or higher, and replacing again the exchange group with H type.

On the other hand, in order to realize a high output density, which is a feature of the polymer electrolyte fuel cell, it is important to form a supply path (gas channel) for the reaction gas in the catalytic reaction layer and improve permeability and diffusion abilities of the gas. Thus, attempts have been made to add a water repellent material such as a fluorocarbon resin to the catalyst reaction layer thereby to form a gas channel. For example, in Japanese Laid-Open Patent Publication No. Hei 5-36418, proposed is a method of forming a catalyst layer by dispersing PTFE powder and a catalyst carrying carbon powder in a solution of a polymer electrolyte and kneading the dispersion. Also proposed in Japanese Laid-Open Patent Publication No. Hei 4-264367 is forming an electrode by using a mixture of a catalyst carrying carbon powder and a colloidal dispersion of PTFE.

Further, in J. Electroanal. Chem. No. 197 (1986), page 195, a method is proposed for forming a gas diffusion electrode for acid electrolyte solution by mixing a carbon powder subjected to water repellency treatment with PTFE with a catalyst carrying carbon powder. On the other hand, in U.S. Pat. No. 5,211,984, a method is proposed for forming a catalyst layer in the electrode only with a polymer electrolyte, a catalyst and a carbon powder without using a water repellent material as described above.

However, when a catalyst carrying carbon powder and a water repellent material such as a fluorocarbon resin or the like, or a carbon powder subjected to water repellency treatment are added at the same time into a dispersion of a polymer electrolyte, a large quantity of polymer electrolyte is adsorbed onto the water repellent material or the carbon powder subjected to water repellency treatment. At this time, larger the amount of the polymer electrolyte adsorbed onto the carbon powder, the degree of contact between the polymer electrolyte and the catalyst becomes less uniform and less sufficient, and as a result, there has been a problem that sufficient reaction area cannot be secured in the interface between the electrode and the ion exchange membrane.

Also, when a dispersion using an alcoholic solvent is applied onto a porous supporting material in the form of a plate, or the above ink-like dispersion is applied onto a porous supporting material, the dispersion penetrates or permeates into the inside of the supporting material. For this reason, the dispersion cannot be formed directly onto the surface of the supporting material and a complicated processing technique such as transcription and the like has been required. Further, in the method of directly applying the ink-like dispersion onto the above-mentioned membrane, a complicated producing technique of exchanging a substituent group of the membrane many times has been required. In addition, in the method of adding a fluorocarbon resin described above, there has been a problem that a catalyst fine powder is coated in excess by the fluorocarbon resin thereby to reduce reaction surface area, which impairs polarization characteristics.

On the other hand, as disclosed in aforementioned J. Electroanal. Chem. No. 197 (1986), page 195, when a carbon powder subjected to water repellency treatment with PTFE is used, a phenomenon that the catalyst particle is coated with PTFE can be suppressed. However, in this proposition, addition of a carbon powder subjected to water repellency treatment when using a polymer electrolyte and the effect thereof in respect to the addition amount have not been studied.

Furthermore, production of electrode only with a catalyst carrying carbon powder and a polymer electrolyte has presented a problem that water generated inside a fuel cell causes a so-called flooding phenomenon and operation of the cell at a high current density lowers the cell voltage and thus makes it unstable.

As a consequence, in order to permit a better performance of the cell, it has been desired to increase the reaction surface area inside the electrode by bringing the polymer electrolyte and the catalyst into contact with each other sufficiently and uniformly.

In addition, it has also been desired to provide a polymer electrolyte fuel cell that exhibits high performance even when operated at a high current density by forming a hydrogen ion channel and a gas channel without excessively coating the catalyst by addition of a fluorocarbon resin thereby improving gas permeability of the electrode.

(4) Improvement of the Catalytic Reaction Layer

The polymer electrolyte used for existing polymer electrolyte fuel cells exhibits the ion conductivity required when it is moist enough with water. On the other hand, the electrode reaction as a cell is a water-generation reaction in the three phase zone of the catalyst, the polymer electrolyte and the reaction gas, and if water vapor in the supplied gas or water generated by the electrode reaction is not discharged promptly and remains inside the electrode or the gas diffusion layer, gas diffusion is suppressed, thereby impairing the characteristics of the cell.

In such a viewpoint, in the electrode for use in polymer electrolyte fuel cells, measures are taken to facilitate moisturization of the polymer electrolyte and discharge of water. For example, as described above, generally employed electrode is one formed with a noble metal carrying carbon powder serving as the catalytic reaction layer on a porous electroconductive electrode supporting material serving as the gas diffusion layer. As the porous electroconductive supporting material, a carbon paper or a carbon cloth made of carbon fiber is used. In general, the porous electroconductive supporting material is primarily subjected to water repellency treatment using a dispersion of PTFE material or the like to facilitate prompt discharge of water generated by the electrode reaction, maintaining the polymer electrolyte membrane and the polymer electrolyte in the electrodes in suitably moist condition. As an alternative for this is employed a method for discharging excessively generated water in the catalytic reaction layer by mixing a carbon powder subjected to water repellency treatment into the catalytic reaction layer.

However, the above-mentioned technique has presented a problem that, although discharge of water in the gas diffusion layer is facilitated, discharge of water in the catalytic reaction layer and gas diffusion to the catalytic reaction layer are deteriorated, and particularly the characteristics of the cell are impaired when the air utilization rate is high or when discharged at a large current.

Further, when a carbon subjected to water repellency treatment with PTFE dispersion particles of submicron order is introduced in the catalytic reaction layer, a large amount of the polymer electrolyte in the catalyst reaction layer is adsorbed onto the carbon powder subjected to water repellency treatment, as previously described, and there has been a problem that the degree of contact between the polymer electrolyte and the catalyst fine particle is insufficient and not uniform, or the catalyst particle is coated with PTFE, making it impossible to secure sufficient three phase zone. Moreover, there has been another problem that, if the catalyst carrying carbon particle is water repellent, the condition of the polymer electrolyte in the polymer electrolyte membrane and the catalytic reaction layer shifts from moist condition to dry condition, thereby deteriorating the characteristics of the cell.

As a consequence, an electrode with high performance designed such that water does not stay in the catalytic reaction layers and also the polymer electrolyte is maintained in a suitably moist condition are demanded.

Thus, an object of the present invention is to solve the above-described problems by controlling the constitution of the electrodes in a fuel cell thereby to improve the efficiency of the electrode reaction in a polymer electrolyte fuel cell.

SUMMARY OF THE INVENTION

The present invention relates to a polymer electrolyte fuel cell comprising a polymer electrolyte membrane and a pair of electrodes having each a catalytic reaction layer and a gas diffusion layer, the above polymer electrolyte membrane being disposed between the pair of electrodes, wherein a part of a carrier, which carries a catalyst particle, in the above catalytic reaction layer penetrates in the inside of the above polymer electrolyte membrane.

It is effective that the above-mentioned carrier is a needle-shaped carbon fiber.

Further, the present invention relates to a polymer electrolyte fuel cell comprising a polymer electrolyte membrane, a catalytic reaction layer, and a pair of electrodes having each a catalytic reaction layer and a gas diffusion layer, the above polymer electrolyte membrane being sandwiched by the pair of electrodes, wherein the fuel cell further comprises a layer comprising an electroconductive fine particle between the above catalytic reaction layer and gas diffusion layer.

In this case, it is effective that a part of the layer comprising an electroconductive fine particle penetrates into the gas diffusion layer.

Also, it is effective that an average primary particle diameter of the above electroconductive fine particle is 10 to 100 nm.

Further, it is effective that the materials of the electroconductive fine particles, which constitute the layers comprising a conductive fine powder, are different on both sides of the polymer electrolyte membrane.

Still further, it is effective that the above electroconductive fine particle is selected from the group consisting of an electroconductive fine particle made of carbon, an electroconductive fine particle made of metal, an electroconductive fine particle made of a carbon-polymer composite and an electroconductive fine particle made of a metal-polymer composite.

It is effective that the above carbon-polymer composite is a carbon powder with PTFE adhered thereon.

It is effective that the PTFE content of the layer comprising an electroconductive fine particle falls in the range of 5 to 75% by weight.

Moreover, the present invention relates to a polymer electrolyte fuel cell comprising a polymer electrolyte membrane and a pair of electrodes having each a catalytic reaction layer and a gas diffusion layer, the above polymer electrolyte membrane being sandwiched by the pair of electrodes, wherein at least either surface of a catalyst particle or a carrier, which carries the catalyst particle, in the catalytic reaction layer has a hydrogen ion diffusion layer.

It is effective that the above hydrogen ion diffusion layer is formed by chemically bonding a silane compound to at least either surface of the catalyst particle or the carrier, which carries the catalyst particle.

It is effective that the above hydrogen ion diffusion layer comprises an organic compound having a basic functional group and a hydrogen ion conductive solid electrolyte, and that the above organic compound modifies at least either surface of the catalyst particle or the carrier, which carries the catalyst particle.

In this case, it is effective that the above basic functional group contains a nitrogen atom having a lone pair.

Also, it is effective that the above organic compound having a basic functional group is a silane compound.

Further, it is effective that the above silane compound has a functional group capable of dissociating a hydrogen ion.

Still further, it is effective that the above silane compound has at least one of a hydrocarbon chain and a fluorocarbon chain.

Moreover, it is effective that the above silane compound is chemically bonded to at least either surface of the catalyst particle or the carrier, which carries the catalyst, via at least one functional group selected from the group consisting of phenol hydroxide group, carboxyl group, lactone group, carbonyl group, quinone group and anhydride carboxylic acid group.

In addition, the present invention relates to a polymer electrolyte fuel cell comprising a polymer electrolyte membrane and a pair of electrodes having each a catalytic reaction layer and a gas diffusion layer, the above polymer electrolyte membrane being sandwiched by the pair of electrodes, wherein the above catalytic reaction layer contains at least a catalyst body comprising a hydrophilic carbon material with a catalyst particle carried thereon and a water repellent carbon material.

In this case, it is effective that a hydrophilic layer is chemically bonded to at least a part of the surface of the catalyst particle.

Further, it is effective that the above catalyst body is selectively disposed on the polymer electrolyte membrane side and the water repellent carbon material on the gas diffusion layer side, respectively in the catalytic reaction layer.

Still further, it is effective that the above water repellent carbon material has a monomolecular layer formed by chemically bonding a silane coupling agent having a hydrophobic moiety to at least a part of the carbon material surface.

Moreover, it is effective that the hydrophilic carbon material has a layer formed by chemically bonding a silane coupling agent having a hydrophilic moiety to at least a part of the carbon material surface.

In addition, it is effective that the above silane coupling agent is chemically bonded to the above carbon material surface via at least one functional group selected from the group consisting of phenol hydroxide group, carboxyl group, lactone group, carbonyl group, quinone group and anhydride carboxylic acid group.

DETAILED DESCRIPTION OF THE INVENTION

Figure 1:
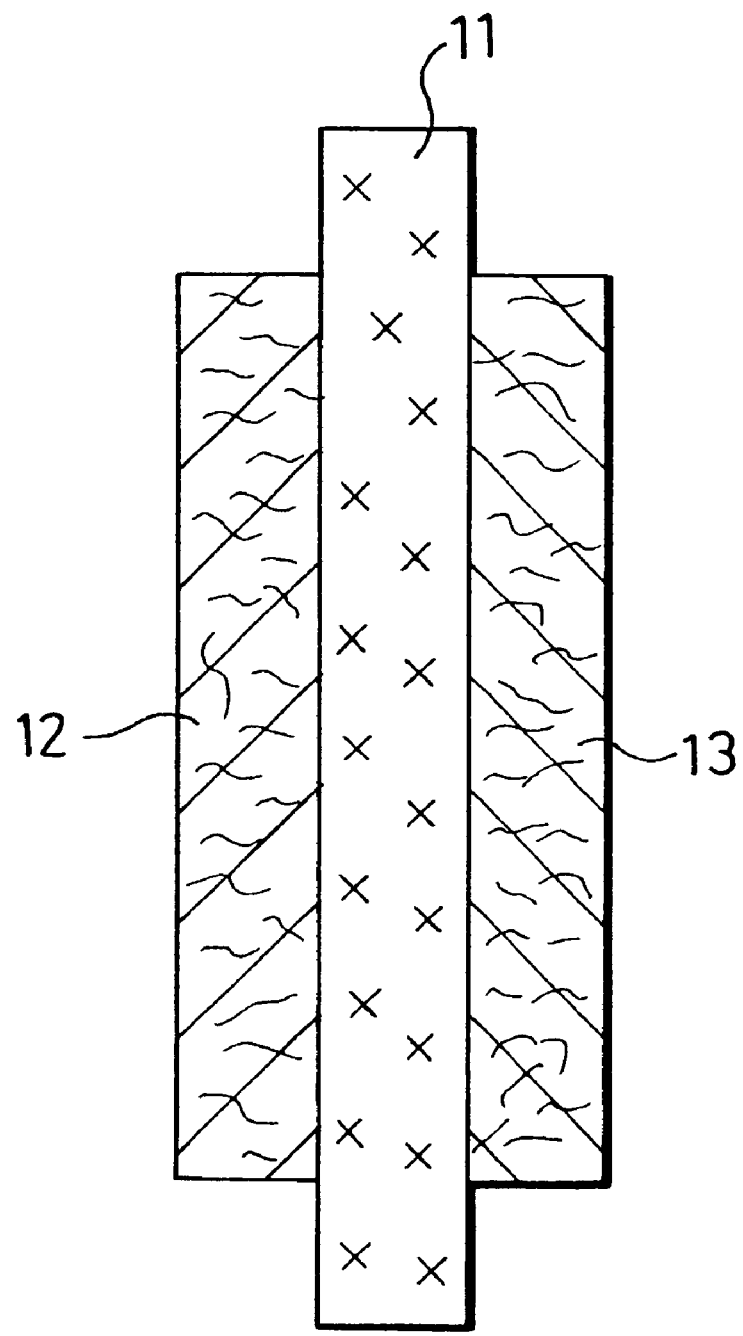
FIG. 1 is a schematic vertical cross sectional view showing a membrane electrode assembly in the examples of the present invention.

In order to solve the problems as previously described, the present invention may employ a variety of embodiments. In the followings, embodiments and examples thereof according to the present invention will be described with regard to each of the above-described problems.

First Embodiment

A first embodiment of the present invention for solving the problem (1) as described above involves a polymer electrolyte fuel cell comprising a laminate consisting of plural electrode pairs each sandwiching a polymer electrolyte membrane, laminated with electroconductive separators interposed therebetween, and a gas supply/discharge means for supplying/discharging a fuel gas provided in one of the above electrodes and another gas supply/discharge means for supplying/discharging an oxidant gas provided in the other electrode, wherein a part of a carbon particle with an electrode reaction catalyst carried thereon penetrates into the inside of the above polymer electrolyte membrane.

In this case, it is effective that the catalyst carrying carbon particle is a needle-shaped fiber.

Further, the polymer electrolyte fuel cell as above can be produced by using a process of mixing a catalyst carrying carbon particle into a carrier gas to make it collide with the polymer electrolyte membrane thereby making a part of the carbon particle penetrate into the inside of the polymer electrolyte membrane.

Also, it can be produced by means of a process of electrostatically charging catalyst carrying carbon particles while accelerating them by an electric field to make them collide with the polymer electrolyte membrane, thereby making a part of the carbon powder penetrate into the inside of the polymer electrolyte membrane.

As described above, in the first embodiment of the present invention, the catalyst carrying carbon particles are made to penetrate or made to be inserted in the inside of the polymer electrolyte membrane, and therefore hydrogen ions generated by the electrode reaction can readily move to the inside of the polymer electrolyte membrane. At the same time, movement of electrons can be facilitated by pressure welding electrodes of carbon paper or the like to one end of the carbon powder.

Next, examples according to the first embodiment of the present invention will be described.

EXAMPLE 1

A glassy carbon powder or a granulated acetylene black powder was made to carry 25% by weight of platinum particles having an average particle diameter of about 30 angstroms. This served as catalyst carrying carbon particles. The average particle diameter of the glassy carbon powder or granulated acetylene black was made to 2 to 10 microns.

On a polymer electrolyte membrane 11 of 50 microns in thickness comprising a main chain of PTFE and a side chain having a sulfonic acid group at the end, the above catalyst carrying carbon powder was dispersed and this was pressed slowly with a pressure of 2000 kgf/10 cm with a pressure roller having a diameter of 10 cm so that the carbon particles were buried and penetrated into the polymer electrolyte membrane. At this time, pressing was done in varying conditions of temperatures and humidities; as a result, the higher the humidity and the higher the temperature, the higher the degree with which the carbon particles penetrated into the membrane. The amount of the catalyst carrying carbon powder made to penetrate into the membrane was about 0.01 to 0.5 mg/cm$^2$, calculated in terms of the platinum amount, per one catalytic reaction layer with any carbon powder.

Next, the polymer electrolyte membrane was sandwiched by a cathode 12 and an anode 13, each made of a polyacrylonitryl type carbon fiber, and these were hot-pressed with a pressure of 10 kgf/cm$^2$ at 110° C. for 5 minutes thereby to bond the polymer electrolyte membrane 1, anode 2 and cathode 3 into one unit. This membrane electrode assembly is shown in FIG. 1.

By using a sealing material made of a fluorocarbon resin and separator plates made of carbon, a laminated cell was constructed by laminating 10 cells of electrodes having a size of 5 cm by 5 cm. Discharge tests were conducted in supplying hydrogen to the anode and air to the cathode; when granulated acetylene black was used as the carbon powder, an output of 0.6 V–0.5 A/cm$^2$ was obtained at a fuel utilization rate of 70% and an air utilization rate of 30%, although the amount used of platinum was as small as 0.3 mg/cm$^2$. This was almost the equivalent performance of the conventional cell with the amount used of platinum of 0.5 g/cm$^2$. A cell with a glassy carbon powder as the carbon powder exhibited inferior performance than the one with the acetylene black. Also, the performance dropped sharply when the amount used of platinum was smaller than 0.2 mg/cm$^2$.

EXAMPLE 2

Next, a variety of methods were studied in order to insert more efficiently the carbon powder into the polymer electrolyte membrane. The catalyst carrying carbon powder was made to collide at a high speed with the polymer electrolyte membrane by using nitrogen as the carrier gas. The gas flow rate of the nitrogen gas was changed in the range of 1 to 200 m/second and the nitrogen gas was moistened to avoid rapid drying of the electrolyte membrane. The average particle diameter of the carbon powder was made 0.1 to 20 microns. In this example, it was possible to make the carbon particles penetrate into the polymer electrolyte membrane without pressing the particles by roller press as done in Example 1. As a result of conducting discharge tests in the same manner as in Example 1, better performance was generally obtained compared to Example 1. When an extremely fine powder of glassy carbon with a particle diameter of 1 micron or smaller, high performance of 0.62 V–0.5 A/cm$^2$ (fuel utilization rate of 70%, air utilization rate of 30%) was obtained although the amount used of platinum was as small as 0.2 mg/cm$^2$. When acetylene black was used, better performance was confirmed as well compared to Example 1.

EXAMPLE 3

In this example, a needle-shaped carbon was used in place of the spherical carbon powder used in Example 2. The needle-shaped carbon used was a polyacrylonitrile type carbon fiber having as large a specific surface area as possible (10 m$^2$/g or larger), with platinum carried thereon (0.01 to 0.03 mg/cm$^2$). The average length of the needle-shaped carbon used was 15 microns. As a result of discharge tests, extremely high performance of 0.64 V–0.5 A/cm$^2$ (fuel utilization rate of 70%, air utilization rate of 30%) was obtained when the amount used of platinum was 0.1 mg/cm$^2$.

Figure 2:
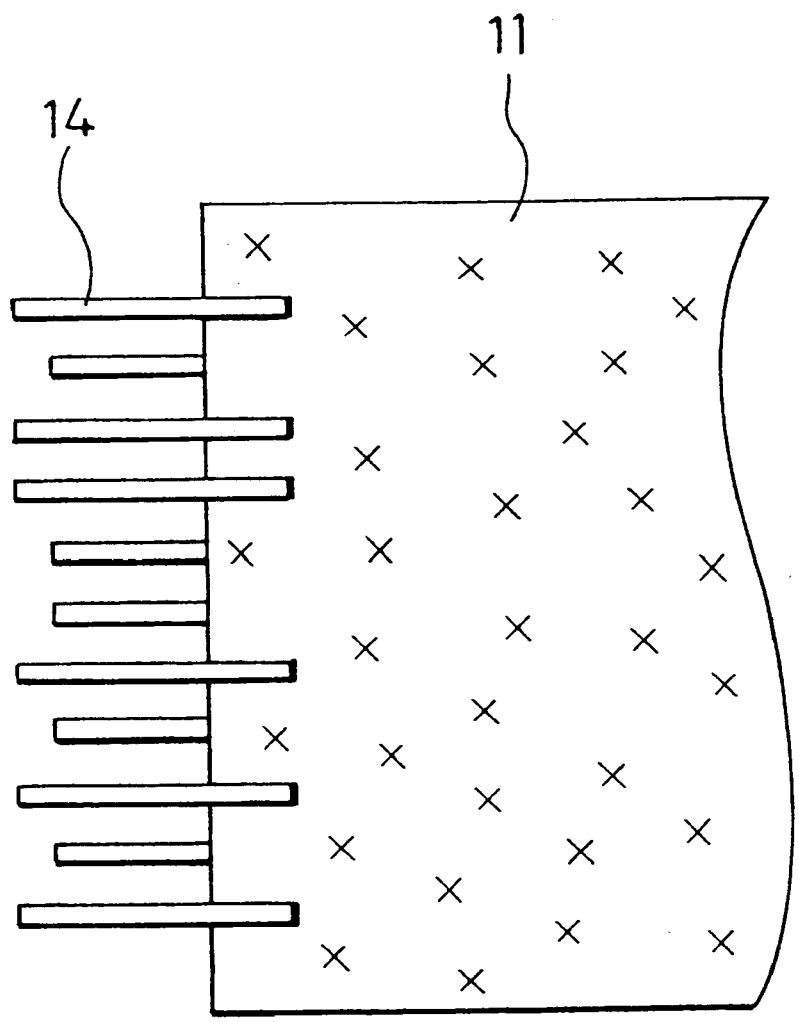
FIG. 2 is a cross sectional view schematically showing the surface of the membrane electrode assembly as shown in FIG. 1.

In a microscopic photograph of the cross section of the polymer electrolyte membrane, as schematically shown in FIG. 2, penetration of a large number of needle-shaped carbon 4 serving as the electrode reaction part was observed. Exposed parts of the needle-shaped carbon 4 in FIG. 2 were buried in the anode or in the cathode. Since needle-shaped particles such as the carbon fibers reach further deep inside the polymer electrolyte membrane, for example as deep as about 10 microns, and fibers are exposed on the surface thereof, electric connection with the electrodes were improved.

EXAMPLE 4

Further, among a variety of methods for making the carbon particles penetrate more efficiently into the polymer electrolyte membrane, an electric acceleration method was studied. A variety of carbon powders with catalyst platinum carried thereon were electrostatically charged by the corona discharge at the same time when they were sprayed from a nozzle. Then, a voltage for acceleration was applied between an injector for injecting the carbon and a fixing device made of a metal for fixing the polymer electrolyte membrane. The voltages for acceleration were examined in the range of 100 V to 5000 V. The implantation amount of carbon powder was controlled by the duration of time. If the carbon powder was driven at a high acceleration voltage for such a long time, the polymer electrolyte membrane happened to be severely curved or damaged. Experiments were carried out under varied conditions by using acetylene black, glassy carbon and needle-shaped carbon, each with a catalyst carried thereon; as a result, an extremely high performance was obtained with the needle-shaped carbon implanted for one minute at an acceleration voltage of 1000 V, and this recorded 0.66 V–0.5 A/cm$^2$ (fuel utilization rate of 70%, air utilization rate of 30%) when the amount used of platinum was 0.07 mg/cm$^2$. It was confirmed to be more effective that the carbon powder was implanted in a decompressed vacuum chamber or a small amount of polymer electrolyte was primarily applied to the carbon particles.

As a result of the series of experiments, it is surmised that the reason why driving the carbon particles with a carrier gas or by electrical acceleration permits a higher performance compared to pushing the carbon particles by means of roller press is that implantation of the carbon particles at a faster speed improves the connectability of the carbon surface with the polymer electrolyte. Further, in the electrodes serving as a current collector, not only the carbon paper used in the present example but also a carbon cloth or an electroconductive sheet with a carbon powder mixed in a resin can be used. Moreover, for improving the electrical contact between the implanted carbon particles and the carbon needles, a good result can also be obtained when a method of primarily applying electroconductive carbon paste on the carbon surface contacting the polymer electrolyte membrane is employed.

Second Embodiment

In order to solve previously-mentioned Problem (2), a second embodiment of the present invention is a polymer electrolyte fuel cell having electrodes each comprising a catalyst layer and a gas diffusion layer, the electrodes being provided on both sides of a polymer electrolyte membrane, wherein a layer comprising an electroconductive fine particle is disposed between the above catalytic reaction layer and the gas diffusion layer.

It is effective that at least a part of the above layer comprising an electroconductive fine particle penetrates into the gas diffusion layer.

Further, it is effective to constitute the layer comprising an electroconductive fine particle with an electroconductive fine particle having an average primary particle diameter of 10 to 100 nm.

Still further, the above electroconductive fine particle may comprise a different material at one side from the other side of the polymer electrolyte.

Moreover, the electroconductive fine particle may be at least one selected from carbon, metal, carbon-polymer composite, and metal-polymer composite. That is, the layer comprising an electroconductive fine particle may be constituted with one kind of electroconductive fine particles, or may be constituted with several kinds of electroconductive fine particles.

As the above carbon-polymer composite, there is a carbon powder with PTFE adhered thereon.

In this case, the layer comprising a conductive fine particle should suitably contain 5 to 75% by weight of PTFE.

According to a second embodiment of the present invention, since a layer comprising an electroconductive fine particle is disposed between the catalytic reaction layer and the gas diffusion layer, the contact resistance between the electrode catalyst layer and the gas diffusion layer is decreased thereby to improve the cell characteristics.

Also, by making a part of the layer comprising an electroconductive fine particle penetrate into the gas diffusion layer, the effect thereof can be further improved. In addition, since the catalytic reaction layer never penetrates into the gas diffusion layer, the amount of the noble metal catalyst used for the catalytic reaction layer can be decreased compared to the conventional method, and thus cost-reduction effect can be expected.

Further, in order to connect the polymer electrolyte and the electrodes, a method such as hot pressing is normally employed. In this case, the use of a carbon material with PTFE adhered to the layer of an electroconductive fine particle provides an advantage that physical bonding property between the electrode catalyst layer and the gas diffusion layer is increased, thereby to facilitate handling. In addition, in this case, a secondary effect can also be expected that, since PTFE is introduced, a part of the water generated in the air electrode can be taken into the polymer electrolyte membrane and the residual generated water can be discharged into the gas diffusion layer side. In this case, it is more effective to make PTFE contents different in the air electrode from the fuel electrode.

As a consequence, in the second embodiment of the present invention, since the layer of an electroconductive fine particle is disposed between the electrode catalyst layer and the gas diffusion layer, a fuel cell exhibiting higher performance compared to the conventional ones can be configured.

Examples of the second embodiment of the present invention will be described below.

EXAMPLE 5

First, a production method of the electrodes used in the fuel cell of the present invention will be described. Acetylene black having an average primary particle diameter of 50 nm was prepared into an ink with butyl acetate and applied onto a carbon paper (TGP-H-120, manufactured by Toray Industries Co., Ltd., membrane thickness of 360 $\mu$m) serving as a gas diffusion layer 1 by means of the screen printing process, and thereby an electroconductive fine particle layer 2 was formed. Further, an electrode catalyst powder comprising a carbon powder with platinum carried thereon at 25% by weight was prepared into an ink by mixing with a dispersion of polymer electrolyte (Flemion, manufactured by Asahi Glass Co., Ltd.) and butyl acetate, and the resulting ink was applied onto the above electroconductive fine particle layer by means of the screen printing process, as employed above, and thereby a catalytic reaction layer is formed. The amount of platinum per unit area was made 0.2 mg/cm$^2$.

Figure 3:
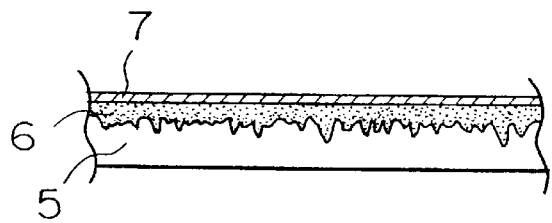
FIG. 3 is a schematic cross sectional view showing an electrode used in Example 5 of the present invention.

The electrodes produced in this manner were disposed on both sides of a polymer electrolyte membrane (Nafion 112, manufactured by Du Pont) and subjected to hot-pressing, thereby a membrane electrode assembly was prepared. FIG. 3 shows a schematic cross sectional view of an electrode of this assembly. This figure shows that a part of electroconductive fine particle layer 6 penetrates into the carbon paper (gas diffusion layer 5). Here, numeral 7 denotes the catalytic reaction layer. In addition, for comparison, electrodes comprising only a catalytic reaction layer and a gas diffusion layer having no electroconductive fine particle layer were also prepared. These electrodes were set in unit cell measuring devices to configure unit cells.

In these unit cells, hydrogen gas was supplied to the fuel electrode and the air to the air electrode, and the unit cells were adjusted to have a cell temperature of 75° C., a fuel utilization rate of 80%, an air utilization rate of 30%, and gas humidification so that the hydrogen gas and the air reach their dew points of 75° C. and 65° C., respectively. The current-voltage characteristics of these cells are compared and shown in FIG. 4. These results indicated that the cell having the electroconductive fine particle layer exhibits higher characteristics compared with the cell having no electroconductive fine particle layer. The reason for this is considered that the provision of the electroconductive fine particle layer reduced the contact resistance between the electrode catalyst and the gas diffusion layer, and also the reaction surface of the platinum catalyst practically contributing to the reaction was increased. This showed that it was possible to further decrease the amount used of Pt.

EXAMPLE 6

Next, studies were carried out in varying the average primary particle diameter of the carbon constituting the electroconductive fine particle layer. Unit cells similar to those in Example 5 were produced and the performance of these cells were examined in using five kinds of carbons having different particle diameters in addition to the acetylene black of 50 nm used in Example 5. The production method of the electrodes and the operation condition of the cells were the same as in Example 5. Table 1 shows the comparison of the cell voltages at the current density of 700 mA/cm$^2$ in these cells.

TABLE 1

| Average primary particle diameter (nm) | Cell voltage (V) |
| --- | --- |
| 5 | 0.59 |
| 10 | 0.63 |
| 50 | 0.64 |
| 100 | 0.63 |
| 500 | 0.58 |

This indicates that the cell performance is higher when the particle diameter falls in the range of 10 to 100 nm. The reason for this is considered that when the particle diameter was too small, the carbon fine particles penetrated completely in the porous carbon paper, which deteriorated the gas diffusion, and thereby the characteristics of the cell was decreased. It is also considered that, when the particle diameter was 500 nm, too large particle diameter deteriorated the contact with the carbon paper, thereby decreasing the characteristics of the cell.

Further, the case in which the materials constituting the electroconductive fine particle layer were varied was studied. Electrodes were produced by using titanium and nickel other than the carbon particles and the electrodes were set in unit cell measuring devices to examine the cell performances. As a result, the equal initial cell performances were observed in using any of the materials.

These results indicated that the fuel cell according to the present invention has a decreased contact resistance compared to the conventional ones because the electroconductive fine particle layer was disposed between the catalytic reaction layer and the gas diffusion layer, and thus it exhibits improved cell characteristics. It was also found that the cell characteristics were higher when materials having a particle diameter of 10 to 100 nm were used. As for the electroconductive materials used, all the materials studied in this example exhibited good results.

In the present invention, the electroconductive fine particle layer was formed by means of the screen printing process, however, any other method can be employed as long as it can form such layer between the catalytic reaction layer and the gas diffusion layer. The polymer electrolyte membrane, the electrode catalyst, and the gas diffusion layer used are not restricted to the ones employed in this example.

EXAMPLE 7

In the present example, the case in which a carbon powder with PTFE adhered thereto was used in the electroconductive particle layer was studied.

The carbon powder with PTFE adhered thereto (PTFE/C) was prepared by mixing acetylene black, PTFE dispersion (D-1, manufactured by DAIKIN INDUSTRIES, LTD.), and a surfactant (Triton X-100, manufactured by ACROSORGANISCO (U.S.A.)) by means of a colloid mill and subsequently heat-treating the resulting mixture. PTFE/C prepared was made to have PTFE content of 30% by weight.

The obtained PTFE/C was screen-printed on the carbon paper in the same manner as in Example 5 to form an electroconductive fine particle layer. Next, a catalytic reaction layer was formed in the same manner to form electrodes. The electrodes obtained were disposed on both sides of Nafion membrane, and this was hot-pressed to produce a membrane electrode assembly (MEA). This MEA had a high connectability over the whole surface, and the reason for this is considered that PTFE serves as a binding agent in MEA.

Figure 5:
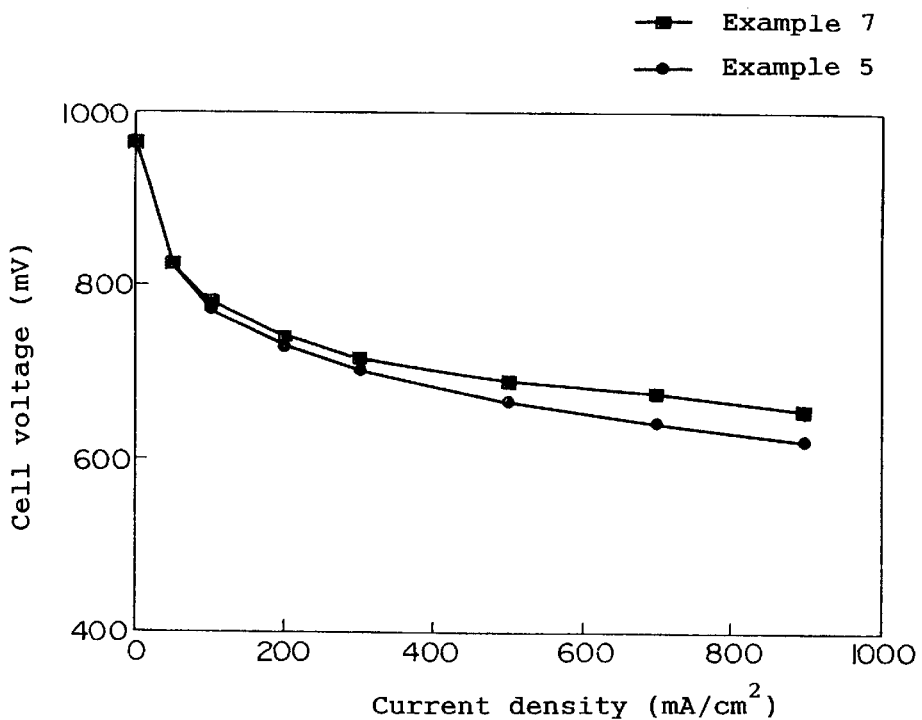
FIG. 5 is a graph showing the relation between the current and the voltage in a unit fuel cell according to Example 6 of the present invention.

In using this MEA, unit cells were configured in the same manner as in Example 5 and the cell performance was examined. The results are shown in FIG. 5 in comparison with the case of Example 5 in which acetylene black was used in the electroconductive fine particle layer. This showed that the use of PTFE/C improved the cell characteristics. The reason for this is considered that the introduction of PTFE improved the water repellency in the periphery of the electrodes.

Next, the cell characteristics were studied in varying the adhesion amount of PTFE. The PTFE amount was varied by adjusting the concentration of PTFE dispersion. Table 2 shows cell voltages at a current density of 700 mA/cm$^2$ with varied PTFE amounts.

TABLE 2

| PTFE amount (% by weight) | Cell voltage (V) |
| --- | --- |
| 1 | 0.63 |
| 5 | 0.66 |
| 10 | 0.67 |
| 25 | 0.68 |
| 50 | 0.68 |
| 75 | 0.67 |
| 80 | 0.57 |

This indicates that the cell performance is increased when PTFE amount falls in the range of 5 to 75% by weight. The reason for this is considered that greater PTFE amount decreased the electroconductivity, thereby deteriorating the cell performance, and smaller PTFE amount decreased the water repellency in the electrodes. From these results, it is found that the use of PTFE/C in the electroconductive fine particle layer improves the connectability of MEA and also the cell performance at the same time. In this case, PTFE/C with varied carrying amounts was used for adjustment of the PTFE amount; however, the PTFE amount can be adjusted by mixing PTFE/C and a carbon powder and it is not restricted to that used in the present invention.

EXAMPLE 8

In this example, the case was studied in which PTFE/C with compositions different in the fuel electrode from the air electrode were used in the electroconductive fine particle layer. PTFE/C with the carried PTFE amount at 60% by weight was used in the electroconductive fine particle layer in the fuel electrode, and PTFE/C with the carried PTFE amount at 30% by weight was used in the electroconductive fine particle layer in the air electrode, and thus each electrode was produced in the same manner as in Example 2. The electrodes produced in this manner were each disposed on each side of Nafion membrane and these were hot-pressed, thereby to produce a membrane electrode assembly (MEA).

Figure 6:
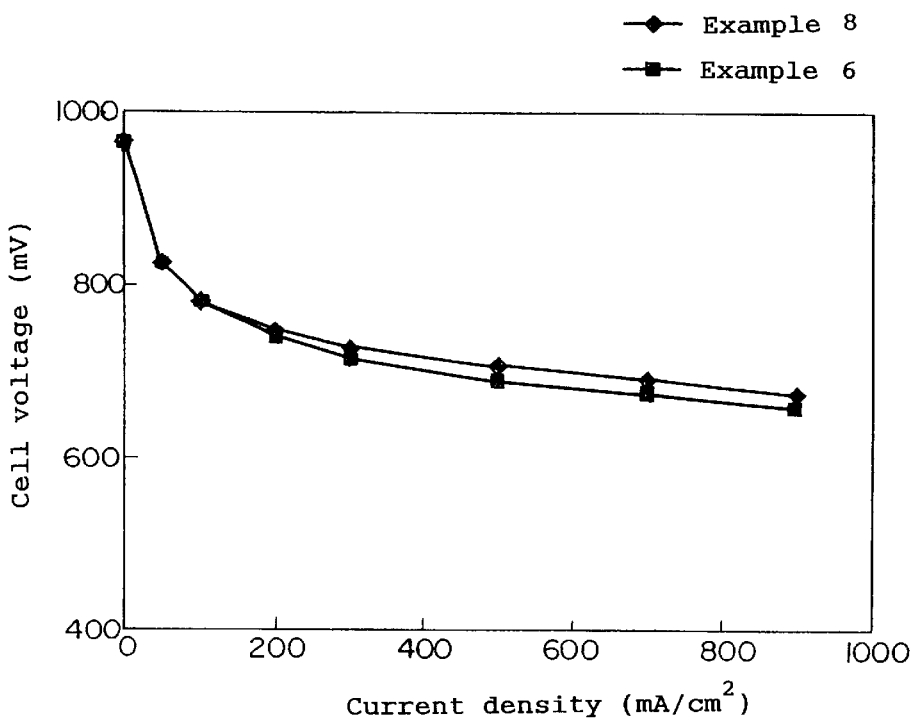
FIG. 6 is a graph showing the relation between the current and the voltage in a unit fuel cell according to Example 7 of the present invention.

This MEA was placed in a unit cell testing device in such a manner that the electrode using PTFE/C with carried PTFE amount of 60% came on the side of the fuel gas supply path and the cell performance was examined. Here, the test conditions of the unit cell were the same as in Example 8. FIG. 6 shows the current-voltage characteristics of this unit cell compared to the case of Example 6, in which PTFE/C with carried PTFE amount of 30% by weight was used on both electrodes.

From the results, it is found that the case of using compositions different in the fuel electrode from the air electrode had improved characteristics compared to the case of using the same composition. The reason for this is considered that the humidification conditions of the polymer electrolyte membrane in the fuel electrode and the air electrode during operation of the cell were improved compared to the case of using the same composition. In this case, PTFE/C with different carried PTFE amounts was used in the electroconductive particle layer; other than this, however, carbon materials, metal fine particles, and composites such as a mixture of a carbon material and PTFE/C and the like can also be used.

Third Embodiment

In order to solve Problem (3) as described previously, a third embodiment of the present invention relates to a polymer electrolyte fuel cell comprising a pair of electrodes having each a catalytic reaction layer, the electrodes sandwiching a polymer electrolyte membrane, wherein a hydrogen ion diffusion layer is provided on either surface of a catalyst particle or a carrier of the catalyst particle.

The above hydrogen ion diffusion layer can be formed by chemically bonding a silane compound to the surface of the catalyst particle or the carrier of the catalyst particle.

Also, by modifying the surface of the catalyst particle or the carrier of the catalyst particle with an organic compound having a basic functional group, the hydrogen ion diffusion layer can be formed with the above organic compound and a hydrogen ion-conductive solid electrolyte.

It is effective that the above basic functional group contains a nitrogen atom having a lone pair.

The above organic compound having a basic functional group is effectively a silane compound.

Further, it is preferable that the above silane compound has a functional group capable of dissociating a hydrogen ion at the end and has at least one of a hydrocarbon chain and a fluorocarbon chain.

The carbon particle or carbon fiber may be chemically bonded to a silane compound through the intermediary of at least one functional group selected from phenolic hydroxyl group, carboxyl group, lactone group, carbonyl group, quinone group and anhydride carboxylic acid group.

In the polymer electrolyte fuel cell according to the third embodiment, the electrodes can be produced in the following manner.

That is to say, at least one kind of material to be bonded selected from catalyst particle, catalyst carrier and carbon fiber is immersed in a solvent containing a silane compound, thereby to make the silane compound chemically adsorbed on the surface of the above material to be bonded, and subsequently the silicon atom in a molecule of the silane compound is chemically bonded to the surface of the material to be bonded, thereby to form a hydrogen ion diffusion layer.

According to the third embodiment, a hydrolyzable group of the silane compound is hydrolyzed on the catalyst metal surface or the catalyst carrier carbon material surface by water contained in the solution or in the air, or water adsorbed on the catalyst surface. At this time, the hydrolyzable group converts into an activated silanol group ($\equiv$SiOH), and reacts with an oxide on the surface of the catalyst metal or functional group on the surface of the carbon material, which permits formation of a solid bond. By making the silane compound have a hydrogen ion dissociating functional group such as sulfonic acid group or carboxyl group, a hydrogen ion conductive layer can be made to coat the catalyst surface in the monomolecular form. Then, by making this coat the catalyst metal and the carbon carrier, a hydrogen ion channel in the monomolecular form can be formed. The monomolecular layer can be controlled to have a thickness in the range of several nm to several tens of nm.

In general, a polymer electrolyte exhibits gas supply ability sufficient for the electrode reaction of fuel cell within about several hundred nm in the direction of the depth thereof. As a consequence, the polymer electrolyte layer according to the third embodiment of the present invention can maintain sufficient gas dissolution property and does not inhibit the supply of the reaction gas by coating the catalyst surface as in the case that conventionally used PTFE dispersion particles of submicron order are used.

Figure 7:
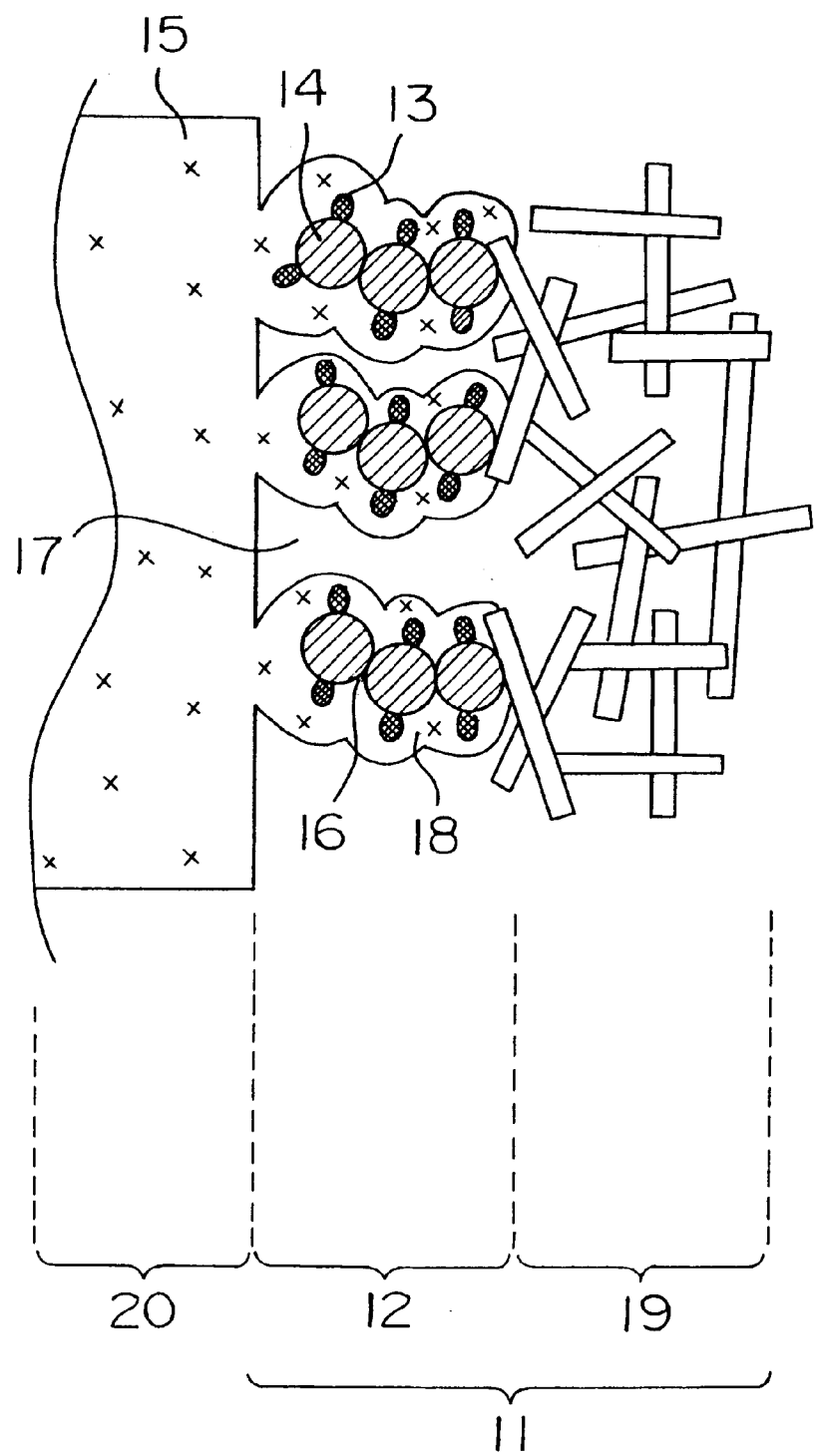
FIG. 7 is a schematic view conceptually showing the state of the electrode portion in Example 9 of the present invention.

FIG. 7 shows the state of the cross section of an electrode for fuel cell according to one example of the present invention. In FIG. 7, as described above, the catalyst powder is made to uniformly adsorb the polymer electrolyte layer, which permits close and uniform adhesion between a catalyst fine particle 13, a carbon fine powder 14 and a polymer electrolyte 15 inside a catalyst layer 12 of an electrode 11.

The constitution of the catalyst layer 12 as above enables efficient formation of three channels extremely close to each other inside the same catalyst layer: namely, a gas channel 17 formed with pores of the carbon powder 14, which serves as a supply path for fuel gas such as hydrogen and oxidant gas such as oxygen; a hydrogen ion channel 18 formed by the polymer electrolyte layer 15; and an electron channel 16 formed by the carbon fine powder connected with each other. In FIG. 7, 19 is a gas diffusion layer and 20 is a polymer electrolyte membrane.

At this time, a reaction represented by the formula: $H_2 \rightarrow 2H^+ + 2e^-$ occurs in the hydrogen electrode, and a reaction represented by: $\frac{1}{2}O_2 + 2H^+ + 2e^- \rightarrow H_2O$ occurs in the oxygen electrode. Here, when the electrode as shown in FIG. 7 is used, supply of hydrogen and oxygen gases and transfer of a hydrogen ion and an electron are done simultaneously and smoothly in a broad area, which increases the reaction speed and the reaction surface area, thereby permitting realization of a polymer electrolyte fuel cell exhibiting higher discharge performance.

Further, since the monomolecular size is sufficiently small, the catalyst inside the micropores, that could not be coated by a conventionally used polymer electrolyte molecule of the order of several hundred nm, can be coated. As a result, the catalyst inside the micropores can be provided with a hydrogen ion channel and made to contribute to the reaction.

At this time, the water repellency of the polymer layer can be increased by making the silane compound have a hydrocarbon chain, and the water repellency of the polymer layer can be further increased by making the silane compound have a fluorocarbon chain.

Also, when substituting —SO$_3$H or —COOH group for the end of the silane compound thereby increasing the hydrophilicity, water retention capacity of the electrodes is improved. As a consequence, for example, when the fuel cell is operated at a low current density and a small quantity of water is generated, or when the fuel cell is operated with a low-humidified air, the electrodes maintain a certain water retention capacity, and a high performance can be achieved. If the water repellency is increased, gas diffusion ability of the electrodes is improved and thereby a high performance can be achieved even when the fuel cell is operated for example at a high current density and a large quantity of water is generated, or when the fuel cell is operated in a high-humidified air.

Figure 8:
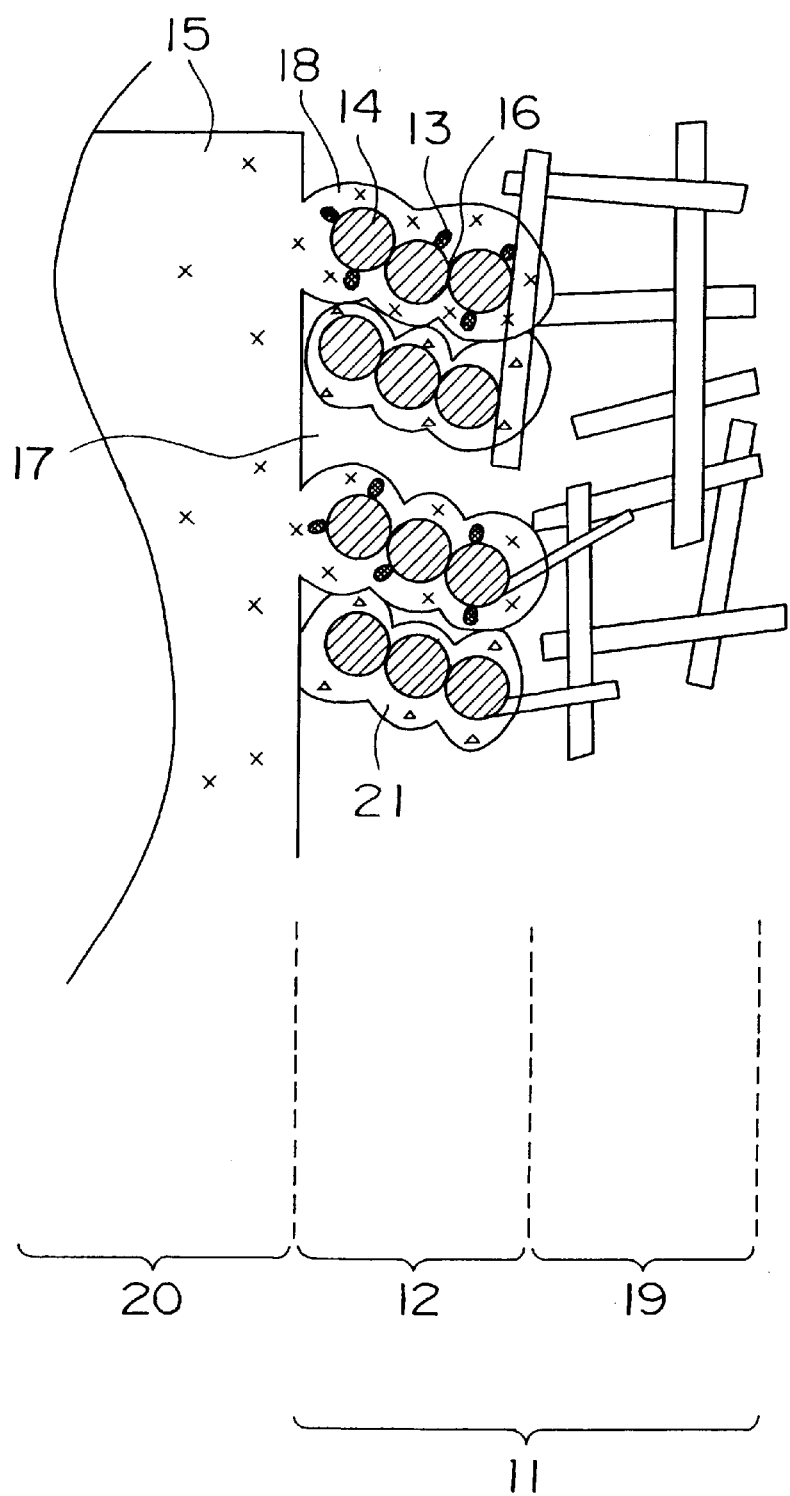
FIG. 8 is a schematic view conceptually showing the state of the electrode portion in Example 10 of the present invention.

Alternatively, as shown in FIG. 8, the hydrogen ion channel can be formed on the catalyst surface by using a hydrogen ion-dissociating functional group and a water repellent silane compound having a hydrocarbon chain, and the gas channel can be formed on the catalyst surface by using a silane compound with higher water repellency having a fluorocarbon chain. By using this, a polymer electrolyte fuel cell exhibiting higher polarization characteristics in a large current density region can be realized. Here, by applying the water repellent silane compound having a fluorocarbon chain onto the carbon powder carrying no catalyst, a water repellent monomolecular layer 21 can be formed and a gas channel 17 can be formed without decreasing the catalyst surface area.

Further, by mixing the polymer electrolyte layer with the above constitution and a conventionally used polymer electrolyte such as "Nafion solution" manufactured by Aldrich Chemical, U.S.A, a hydrogen ion channel continuing from the catalyst inside the micropores to the electrolyte membrane surface can be formed and thereby the electrodes exhibiting a higher performance with a large reaction surface area and a small internal resistance can be realized.

Moreover, a hydrolyzable group of the silane compound is hydrolyzed, on the catalyst metal surface or the catalyst carrier carbon material surface, with water in the solution or in the air, or water adsorbed on the catalyst carrier. At this time, the above hydrolyzable group is converted into active silanol group ($\equiv$SiOH), which can form a strong bond by reacting with an oxide on the catalyst metal surface or a functional group on the carbon material surface. By making this silane compound have a basic functional group containing a nitrogen atom having a lone pair at the end, for example an amid group or an amine group, mutual reaction with a polymer electrolyte having a residual group of an acid such as sulfonic acid can be caused. At this time, a polymer electrolyte layer can be formed by strongly pulling the polymer electrolyte onto the monomolecular surface, that is, close to the catalyst carrier surface. As a consequence, a hydrogen ion channel, which is a minute hydrogen ion conductive layer, can be formed on the catalyst and catalyst carrier surface.

This effect is resulted from that the mutual reaction between the basic of the monomolecular layer coating the catalyst carrier and the acidic of the polymer electrolyte enabled the presence of the polymer electrolyte more close to the catalyst metal.

Also, the proportion of coating the catalyst metal is increased because of the presence of the polymer electrolyte in the vicinity of the catalyst, which enabled formation of the hydrogen ion channel effectively transferring a hydrogen ion generated by the catalyst reaction and improved catalyst efficiency as well.

When the main chain skeleton of the silane compound forming the monomolecular layer is a hydrocarbon chain, the water repellency of the hydrocarbon chain is relatively week, and therefore the whole catalyst layer is in the wet state. This indicates that water retention capacity of the electrodes is improved. That is to say, it indicates that the electrodes maintain a certain water retention capacity and permits excellent performance even when the fuel cell is operated at a low current density with little water generated, or when the fuel cell is operated in a low-humidified air.

Figure 13:
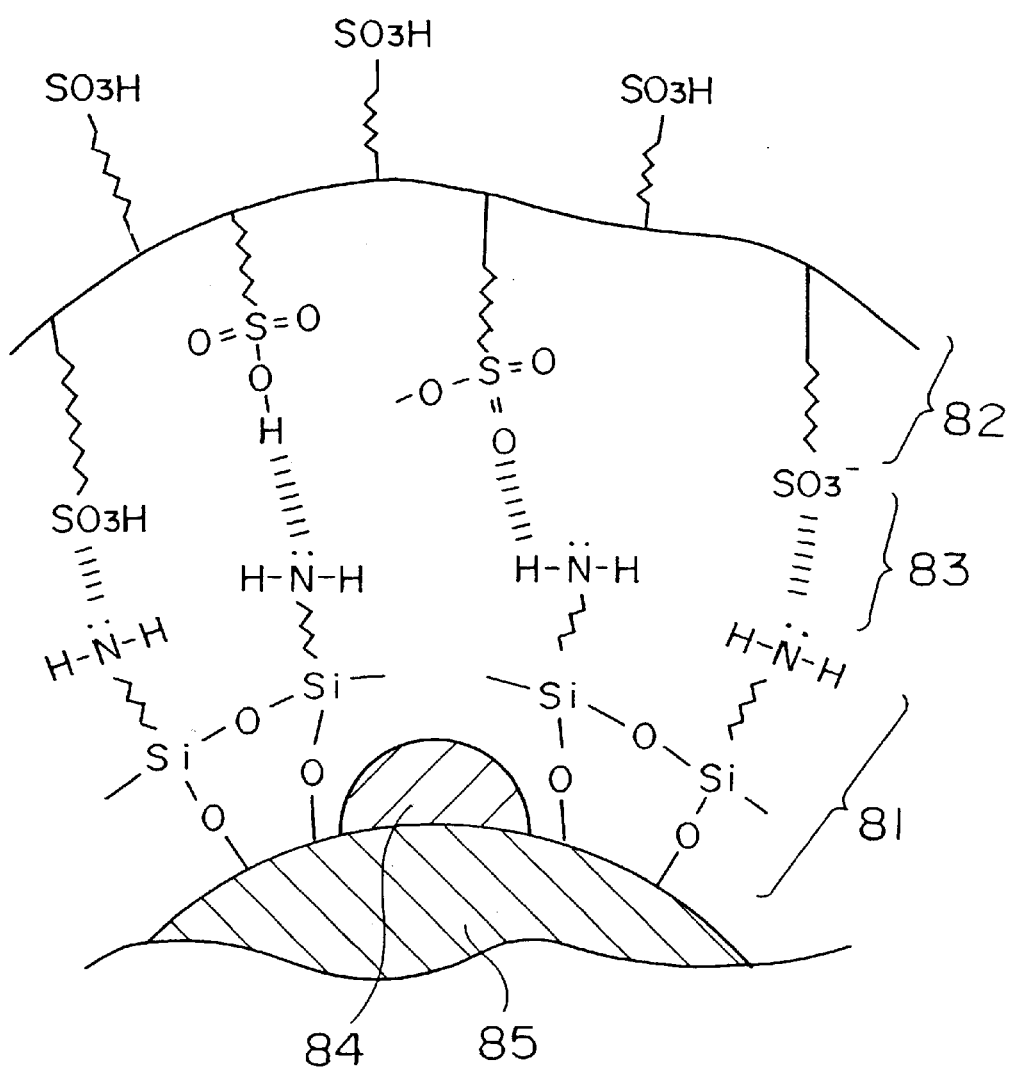
FIG. 13 is a schematic view conceptually showing the sate of the surface of a catalyst carrier in Examples 9 and 10 of the present invention.

On the other hand, a hydrogen fluoride chain shows high water repellency, and as shown in FIG. 13, a monomolecular layer 81 is formed in using a silane compound having a hydrogen fluoride chain, and when a polymer electrolyte having a hydrogen fluoride chain (for example, Flemion manufactured by Asahi Glass Co., Ltd.) is used, a water repellent layer 83 can be formed between the monomolecular layer 81 and a polymer electrolyte layer 82 by the water repellency effect of both. At this time, water present in the water repellent layer 83 is facilitated to take out the reaction-generated water by the water repellency effect of both layers, and an effect of humidifying the inside of the electrodes in an appropriate condition can be maintained.

In this manner, when the polymer electrolyte fuel cell is operated at a high current density and a large quantity of water is generated, or when high-humidified air is used, sufficient gas diffusion ability can be exhibited in the electrodes by this water repellency effect, and thus a sufficiently high cell performance can be achieved.

Also, when a silane compound having a hydrocarbon chain is used, a hydrogen ion channel can be formed on the catalyst surface, and when a silane compound having a hydrogen fluoride chain is used, a gas channel can be formed on the catalyst surface. As described above, by changing the principal chain skeleton of the silane compound, the characteristics of the catalyst layer in the electrodes can be designed in compliance with suitable operation environment, and thereby a polymer electrolyte fuel cell exhibiting high discharge characteristics can be realized.

The third embodiment according to the present invention will be described below.

EXAMPLE 9

Figure 9:
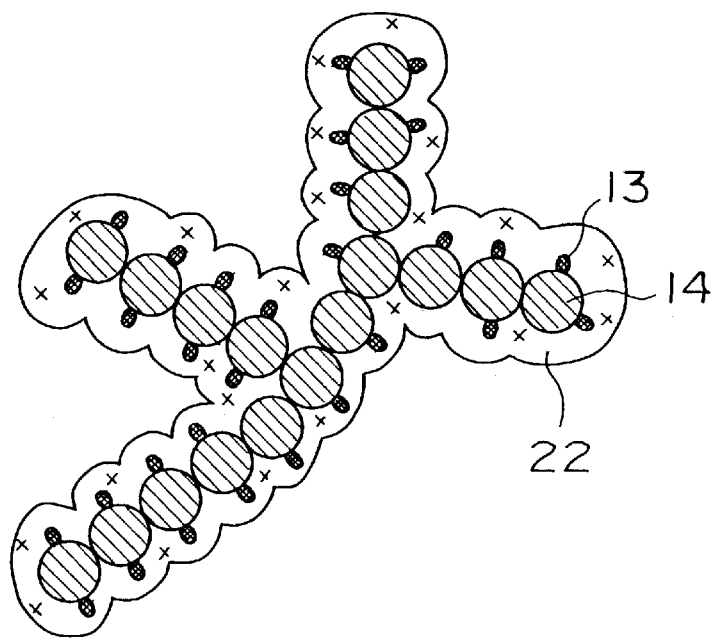
FIG. 9 is a schematic cross sectional view showing the catalyst fine particle or catalyst carriers with a monomolecular membrane adsorbed thereon in Examples 9 and 10 of the present invention.

As shown in FIG. 9, on the surface of carbon particles 14 carrying 20% by weight of catalyst particles 13 comprising platinum in the form of particle having a particle diameter of around 1 to 10 nm, a silane compound was adsorbed directly by chemical adsorption under nitrogen gas atmosphere, thereby a monomolecular protection film 22 comprising a silane compound is formed. As the silane compound, CH$_3$—(CH$_2$)n-SiCl$_3$ (n is a positive number of 10 or over and not over than 25) was used, and n-hexane dissolved to have a concentration of 1% by weight was prepared, into which the above-described carbon powder with platinum particle carried thereon was immersed.

At this time, natural oxidized film is formed on the surface of the catalyst particles 13, in which a —OH group or an oxide is contained. Also, as the carbon powder 14, used was a carbon powder having a surface functional group such as phenolic hydroxyl group, carboxyl group, lactone group, carbonyl group, quinone group and anhydride carboxylic acid group on the surface thereof. Then, by conducting HCl elimination reaction with —SiCl$_3$ group, —OH group or other functional group or oxide, a monomolecular adsorption film 22 is formed with a silane compound to have a thickness of about 2 to 10 nm on the surface of the catalyst metal 13 and the surface of the carbon carrier 14. It was also possible to form the above film to have a thickness of about 1 to 100 nm by changing the molecular weight of the monomolecular.

It should be noted that the material for chemical adsorption are not restricted to the silane compound used above, and any material can be used as long as it contains groups having bonding property to —OH group or oxide, for example, SiCl group and the like.

Figure 10:
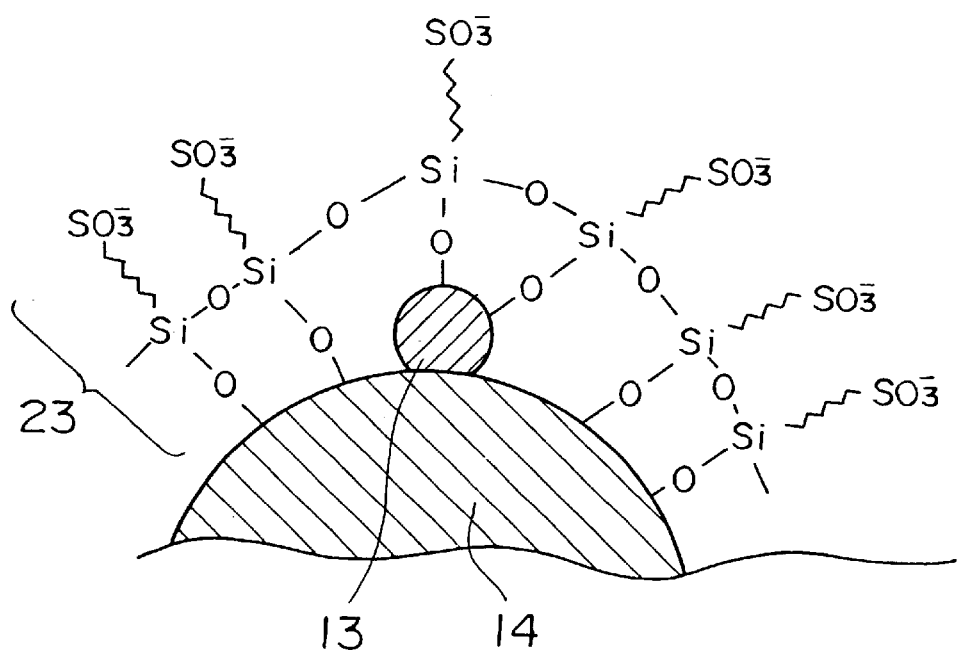
FIG. 10 is a schematic view conceptually showing the state of an adsorbed monomolecular membrane in Examples 9 and 10 of the present invention.

Further, as shown in FIG. 10, silane compounds containing for example sulfonic acid group or carboxyl group as hydrogen ion dissociating functional groups as shown below could be hydrolyzed for use. That is, $SiCl_3$—$(CH_2)n$-$SO_2Cl$ (n is an integer), $SiCl_3$—$(CH_2)n$-$COOCH_3$ (n is an integer), $SiCl_3$—$(CH_2)n$-$(C_6H_4)$—$SO_2Cl$ (n is an integer), $SiCl_3$—$(CH_2)n$—$(C_6H_4)$—$COOCH_3$ (n is an integer) and the like. By this method, a hydrogen ion conductive monomolecular layer 23 was formed on the surface of the catalyst metal 13 and the catalyst carrier 14.

EXAMPLE 10

In this example, a silane compound containing a fluorine in a part of the linear hydrocarbon chain thereof, that is, $SiCl_3$—$(CH_2)_2$—$CF_3$ was dissolved in cyclic silicone oil (KF994, manufactured by Shin-Etsu Chemical Co., Ltd.) for use, and a water repellent monomolecular layer 21 was formed on the carbon carrier surface in the same manner as shown in Example 9 above. The use of such a silane compound enabled to increase the water repellency in the electrodes and also enabled to form a gas channel for supplying the reaction gas.

Here, as the silane compound containing fluorine in a part of the linear hydrocarbon chain, $SiCl_3$—$(CH_2)_2$—$(CF_2)m$-$CF_3$(m is an integer of 0 to 9) could also be used.

EXAMPLE 11

In this example, by using $SiCl_3$—$(CH_2)n$-$(CF_2)m$-$SO_3H$ (n and m are integers of 2 to 10), which is a silane compound containing a sulfonic acid group as a hydrogen ion-dissociating group and containing a fluorine in a part of the linear hydrocarbon chain thereof, a hydrogen ion conductive monomolecular layer 23 was formed on the surface of the catalyst metal 13 and the carbon carrier 14.

Here, as the hydrogen ion dissociating functional group, silane compounds containing sulfonic acid group or carboxyl group and the like and containing fluorine in a part of the linear hydrocarbon chain, as shown below, could also be used. That is to say, an effect can be obtained by using $SiCl_3$—$(CH_2)_2$—$(CF_2)m$-$SO_2Cl$ (n and m are integers), $SiCl_3$—$(CH_2)_2$—$(CF_2)m$-$COOCH_3$ (n and m are integers), $SiCl_3$—$(CH_2)_2$—$(CF_2)m$-$(C_6H_4)$—$SO_2Cl$ (n and m are integers), $SiCl_3$—$(CH_2)_2$—$(CF_2)m$-$(C_6H_4)$—$COOCH_3$ (m is an integer) and hydrolyzing these.

COMPARATIVE EXAMPLE 1

For comparison, using "5% by weight-Nafion solution" manufactured by Aldrich Chemical (U.S.A.), carbon fine powder 14 carrying this and platinum catalyst ultra fine particles 13 having a particle diameter of around 1 nm to 10 nm at 20% by weight was prepared. This carbon fine powder 14 was mixed with butanol and dispersed with a ball mill, and subsequently applied onto a carbon paper (TGP-H-120, manufactured by Toray Industries, Inc., membrane thickness of 360 μm) thereby to prepare the electrode 11 with the catalyst layer formed thereon.

[Evaluation 1]

As described above, by using electrode catalyst powders described in Examples 9 to 11 and Comparative Example 1, the catalyst layer 12 was formed by applying these onto the carbon paper (TGP-H-120, manufactured by Toray Industries, Inc., film thickness of 360 μm) serving as the gas diffusion layer 19, which gave the electrode 11.

Figure 11:
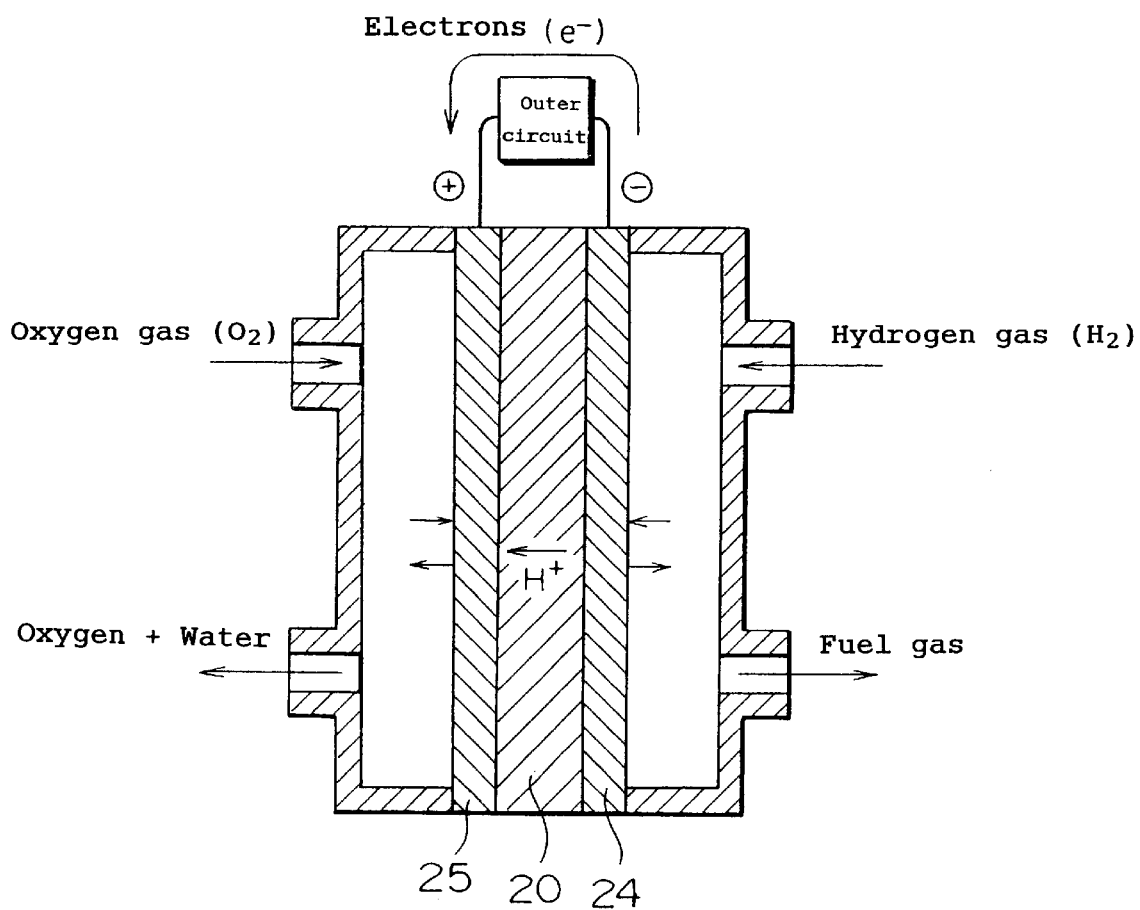
FIG. 11 is a schematic cross sectional view showing a fuel cell prepared in Examples 9 to 11 and 14 to 16 of the present invention.

The electrodes thus produced were disposed on both sides of a polymer electrolyte membrane (Nafion 112, manufactured by Du Pont) 10 and these were hot-pressed to produce a membrane electrode assembly, and then unit cells obtained were tested by preparing fuel cell measuring cells as shown in FIG. 11.

In FIG. 11, numeral 20 is the polymer electrolyte membrane. In FIG. 11, numerals 24 and 25 are the anode and the cathode, respectively. The addition amount of the polymer electrolyte was 1.0 mg/cm$^2$ per apparent electrode surface, and equal characteristics were obtained in the range of 0.1 to 3.0 mg/cm$^2$. Also, the addition amount of platinum was made 0.5 mg/cm$^2$ per electrode surface in the same manner.

In these unit cells, hydrogen gas was supplied to the anode 24 and air was supplied to the cathode 25. Then, discharge tests of the cells was carried out in adjusting the cell temperature to 75° C., the fuel utilization rate to 80%, the air utilization rate to 30%, and the gas humidification so that the hydrogen gas and the air had their dew points of 75° C. and 65° C., respectively.

Unit cells produced according to the methods of Examples 9 and 11 and Comparative Example 1 were named A, B and X, respectively. Also, a unit cell using a catalytic reaction layer prepared by mixing the catalyst powder treated as in Example 9 and the carbon carrier treated as in Example 10 was named C.

Figure 12:
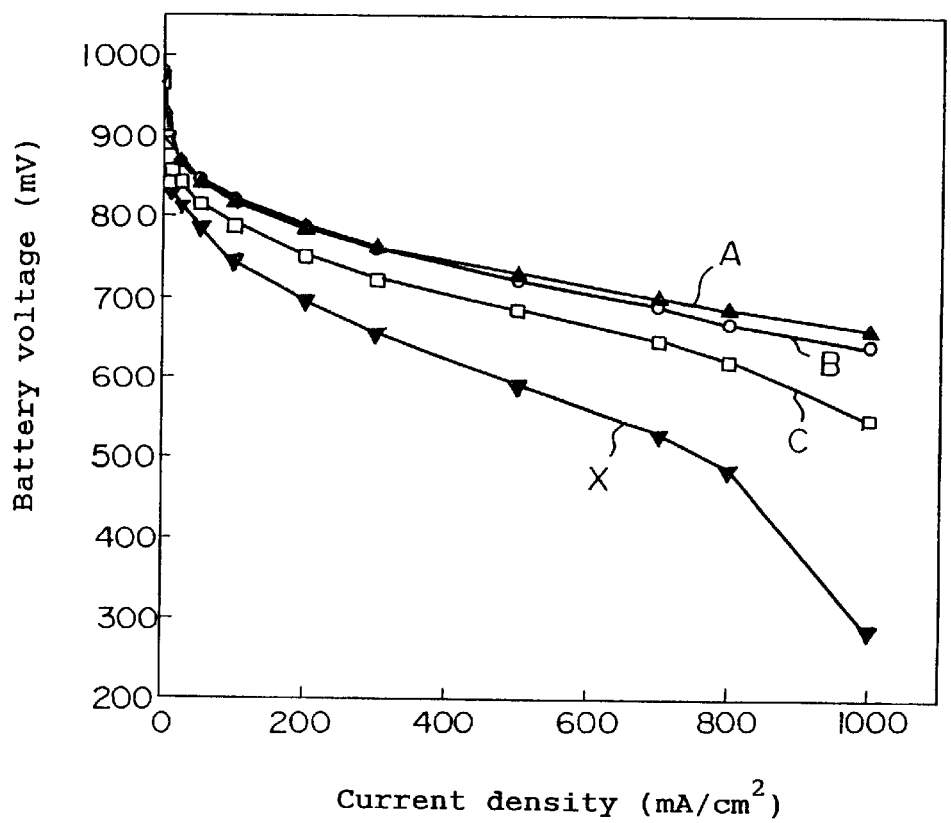
FIG. 12 is a graph showing the characteristics of a fuel cell configured with the electrodes of Examples 9 to 11 of the present invention.

Here, FIG. 12 shows the current-voltage characteristics of the cells A, B, C and X according to the examples and Comparative Example 1 of the present invention. Also, Table 3 shows the current density characteristics when the cell voltage was 850 mV, which is a reaction rate-determining region, and the cell voltages when the current density of the cells was 1000 A/cm$^2$.

TABLE 3

| Cell | Current density (mA/cm$^2$) | Voltage (V) |
| --- | --- | --- |
| A | 48 | 0.55 |
| B | 50 | 0.64 |
| C | 50 | 0.66 |
| X | 9 | 0.29 |

In Table 3, the current density at the cell voltage of 850 mV was 9 mA/cm$^2$ in the cell X of the Comparative Example 1, whereas in the cells A, B and C using the electrodes of this example maintained a current density of 48, 50 and 50 mA/cm$^2$, respectively, which were excellent characteristics of more than 5 times of the comparative example. The reason for this is considered that the electrodes of the present invention have a reaction surface area of more than 5 times of the electrodes of the comparative example.

Further, in the electrodes of the present invention, a monomolecular layer of a polymer having a film thickness of about 1 to 100 nm could be formed. Since the monomolecular size was sufficiently small, the catalyst inside the micropores which polymer electrolyte molecules of several hundred nm order such as "Nafion solution" could not adsorb could be coated, and a hydrogen ion channel was formed in the catalyst inside the micropores and could contribute to the reaction, and as a result, high current density could be obtained.

Also, the cell voltage at the current density of 1000 mA/cm$^2$ was 0.29 V in the cell C of the comparative Example, whereas the cells A, B and C could maintain higher values of 0.55, 0.64 and 0.66, respectively. The reason for this is considered that since the electrodes of the present invention have a large reaction surface area, as mentioned above, higher characteristics could be obtained even when the cell was operated at a high current density as compared to the comparative example. Further, in the cell B, the hydrogen ion conductive monomolecular layer itself contains a fluorine in a part of the hydrocarbon chain, which permitted improved gas solubility and improved gas supply ability to the catalyst and thereby the characteristics in the high current density region were improved. Moreover, in the cell C, a catalytic reaction layer was formed by mixing the catalyst powder with adsorbed thereon a hydrogen ion conductive monomolecular layer treated as in Example 9 and the carbon carrier with adsorbed thereon a monomolecular layer containing a fluorine in a part of the linear hydrocarbon chain according to Example 10, which is considered to have further increased the gas supply ability in the catalyst layer thereby to improve the characteristics in the high current density region.

EXAMPLE 12

Figure 14:
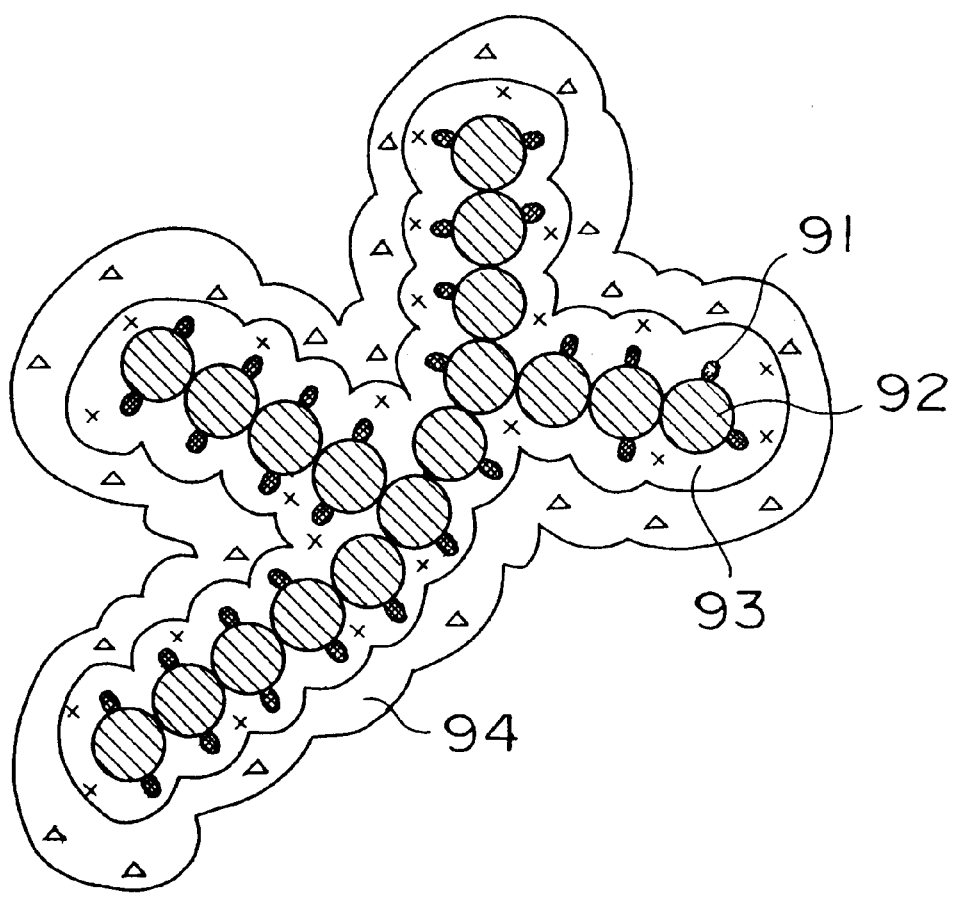
FIG. 14 is a cross sectional view showing catalyst fine particles or catalyst carriers with a monomolecular membrane adsorbed thereon in Examples 9 and 10 of the present invention.

As FIG. 14 shows, on the surface of carbon particles 92 carrying 20% by weight of catalyst particles 91 comprising platinum in the form of particle having a diameter of around 1 to 10 nm, a silane compound was adsorbed directly by chemical adsorption under a nitrogen gas atmosphere and a monomolecular protection film comprising the silane compound was formed. By using $CH_3$—$(CH_2)$n-$Si(OCH_3)_3$ (n is an integer of 2 to 10) having a linear hydrocarbon chain was used as the silane compound, an ethanol solution dissolving the same at a concentration of 1% by weight was prepared, into which the above-mentioned platinum particle carrying carbon powder was immersed, and this was heated at 60° C. for one hour.

At this time, on the surface of the catalyst particles 91 formed was a natural oxidized film, which contains —OH group and oxide. Also, as the carbon powder 92 used was a carbon powder with surface functional group such as phenolic hydroxyl group, carboxyl group, lactone group, carbonyl group, quinone group, or anhydride carboxylic acid group are present on the surface thereof. Then, by subjecting this to alcohol elimination reaction with —$Si(OCH_3)_3$ group, —OH group, or other functional group or oxides, a monomolecular adsorption film 93 of a silane compound was formed to have a thickness of around 2 to 10 nm on the surface of the catalyst metal 91 and the surface of the carbon carrier 92. Also, it could be formed to have a thickness of about 1 to 100 nm by changing the molecular amount of the monomolecular.

It should be noted that the material for chemical adsorption is not restricted to the silane compound used above as long as it contains group capable of bonding with —OH group or oxide, for example, $\equiv Si(OCH_3)$, $\equiv Si(OC_2H_5)$ groups and the like.

Also, as shown in FIG. 13, as a basic functional group containing a nitrogen atom having a lone pair, $Si(OCH_3)_3$—$(CH_2)$n-$NH_2$ (n is an integer of 2 to 10), which is a silane compound containing an amine group was used. By this method, the monomolecular layer 93 was formed on the surface of the carbon powder 92. Further, by an action of end basic group, a polymer electrolyte layer 94 was formed minutely close to the surface of the catalyst metal and carbon carrier in such a way that it covered the monomolecular layer 93, and thereby a hydrogen ion channel which transfers effectively hydrogen ions was formed.

In this example, silane compounds having amid group or amine group as the basic functional group containing a nitrogen atom having a lone pair, such as $Si(OCH_3)_3$—$(CH_2)$n-$NH_2$ (n is an integer of 2 to 10), $Si(OCH_3)_3$—$(CH_2)$m-NH—$(CH_2)$n-$NH_2$ (m and n are integers of 2 to 10), $Si(OCH_3)_3$—$(CH_2)$n-$(C_6H_4)$-$NH_2$ (n is an integer of 2 to 10), $Si(OCH_3)_3$—$(CH_2)$m-$N(CH_3)_2$ (m is an integer of 2 to 10), $Si(OCH_3)_3$—$(CH_2)$n-$(C_6H_4)$-$N(CH_3)_2$ (n is an integer of 2 to 10), $Si(OC_2H_5)_3$—$(CH_2)$n-$N(CH_2CH_2OH)_2(CH_2)$n (n is an integer of 2 to 10) could be used, for example.

EXAMPLE 13

In this example, by using $Si(OCH_3)_3$—$(CH_2)$n-$(CF_2)$m-$NH_2$ (n and m are integers of 2 to 10) as a silane compound containing amine group as the basic functional group containing fluorine in a part of the linear hydrocarbon chain, a monomolecular layer 22 was formed on the surface of the catalyst metal 13 and the carbon carrier 14 in the same manner as the one having linear hydrocarbon chain.

As the silane compound used which contains an amine group or an amid group and contains fluorine in a part of the linear hydrocarbon chain, $Si(OCH_3)_3$—$(CH_2)$n-$(CF_2)$m-$NH_2$ (n and m are integers of 2 to 10), $Si(OCH_3)_3$—$(CH_2)$m-NH—$(CH_2)$n-$(CF_2)$l -$NH_2$ (m, n and l are integers of 2 to 7), $Si(OCH_3)_3$—$(CH_2)$n-$(CF_2)$m-$N(CH_3)_2$ (n and m are integers of 2 to 8), $Si(OCH_3)_3$—$(CH_2)$n-$(CF_2)$m-$(C_6H_4)$-$NH_2$ (n and m are integers of 2 to 7), $Si(OCH_3)_3$—$(CH_2)$n-$(CF_2)$m-$(C_6H_4)$—$N(CH_3)_2$ (n and m are integers of 2 to 7), and $Si(OC_2H_5)_3$—$(CH_2)$n$(CF_2)$m-$N(CH_2CH_2OH)_2$ (n and m are integers of 2 to 7) could also be used.

COMPARATIVE EXAMPLE 2

For comparison, by using "5% by weight-Nafion solution" manufactured by Aldrich Chemical (U.S.A), a fine carbon powder 14 carrying the same and ultra fine platinum catalyst particles 13 having a diameter of around 1 to 10 nm at 20% by weight was prepared. By mixing this carbon fine powder 14 with butanol and dispersing the same with a ball mill, and then applying the resulting material onto a carbon paper (TGP-H-120, manufactured by Toray Industries, Inc., film thickness of 360 μm), electrodes 11 formed with a catalytic reaction layer 12 were produced.

[Evaluation 2]

By using the electrode catalyst powders described in Examples 12 and 13 and Comparative Example 2 above, these electrode catalyst powders were applied onto carbon papers (TGP-H-120, manufactured by Toray Industries, Inc., film thickness 360 μm) serving as the gas diffusion layers to form the catalytic reaction layers, thereby obtaining the electrodes.

The electrodes thus produced were disposed on both sides of a polymer electrolyte membrane (Nafion 112, manufactured by Du Pont) 20, and these were subjected to hotpressing and thereby a membrane electrode assembly was produced. By using unit cells obtained, tests were conducted by preparing fuel cell measurement cells as shown in FIG. 10.

Discharge tests of the cells were carried out by supplying hydrogen gas to the anode 24 and air to the cathode 25 of these unit cells and adjusting the cell temperature to 75° C., the fuel utilization rate to 80%, the air utilization rate to 30% and the gas humidification so that the hydrogen gas and the air had their dew points of 75° C. and 65° C., respectively.

Cells produced by using the electrodes prepared in Examples 12 and 13 and Comparative Example 2 were called respectively D (hydrocarbon chain type), E (fluorocarbon chain type), and Y (non surface-treated type).

Figure 15:
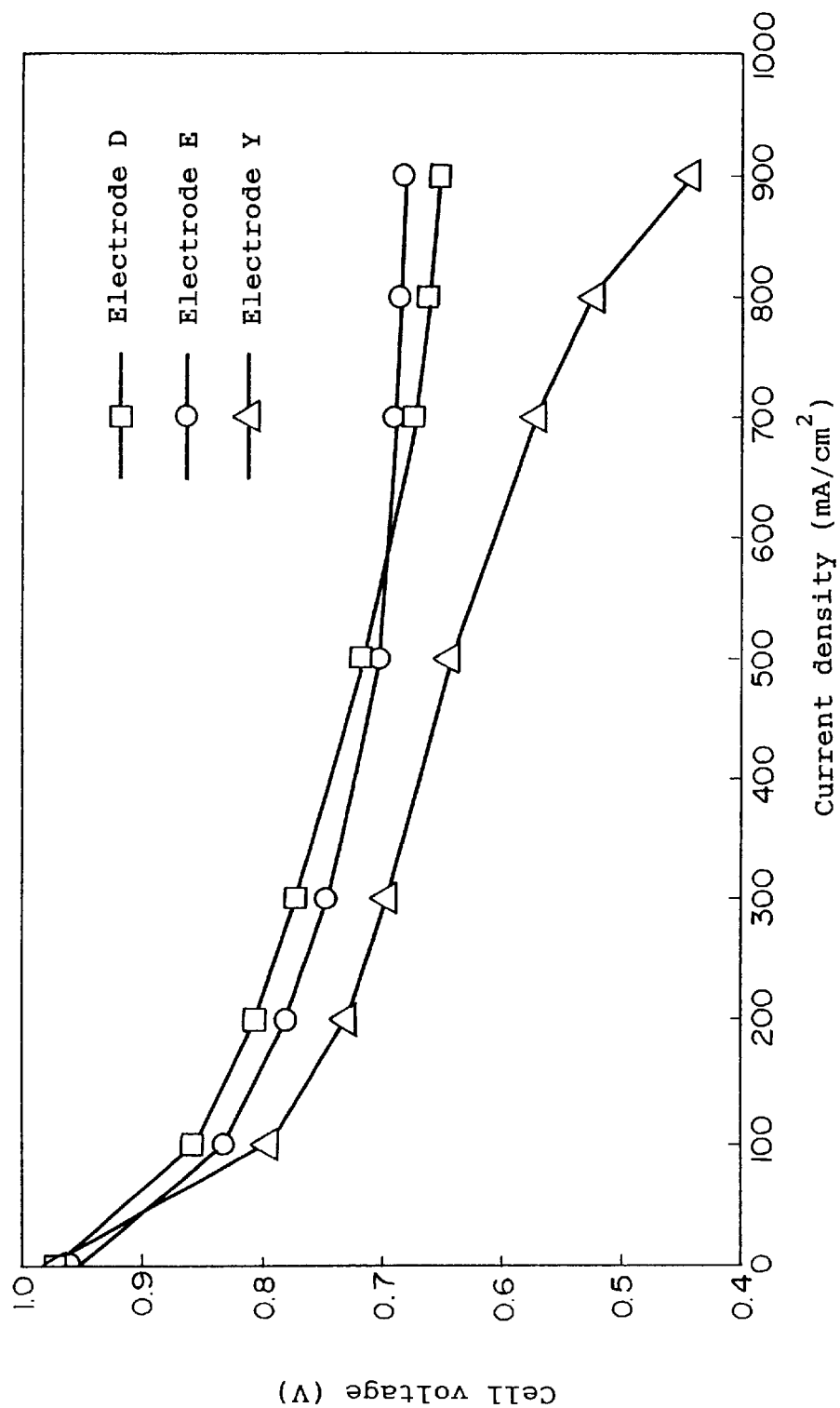
FIG. 15 is a graph showing the characteristics of a fuel cell configured with the electrodes according to Examples 9 and 10 of the present invention.

FIG. 15 shows the current-voltage characteristics of the cells D, E and Y according to the examples and the comparative example of the present invention. Further, Table 4 shows cell voltages when the operation current density of the cell were made 300 mA/cm$^2$, which was a low current density, and also 700 mA/cm$^2$, which was a high current density.

TABLE 4

| Cell | Cell voltage (mV) | |
|---|---|---|
| | I = 300 mA/cm$^2$ | i = 700 mA/cm$^2$ |
| D | 770 | 670 |
| E | 750 | 690 |
| Y | 700 | 600 |

Figure 4:
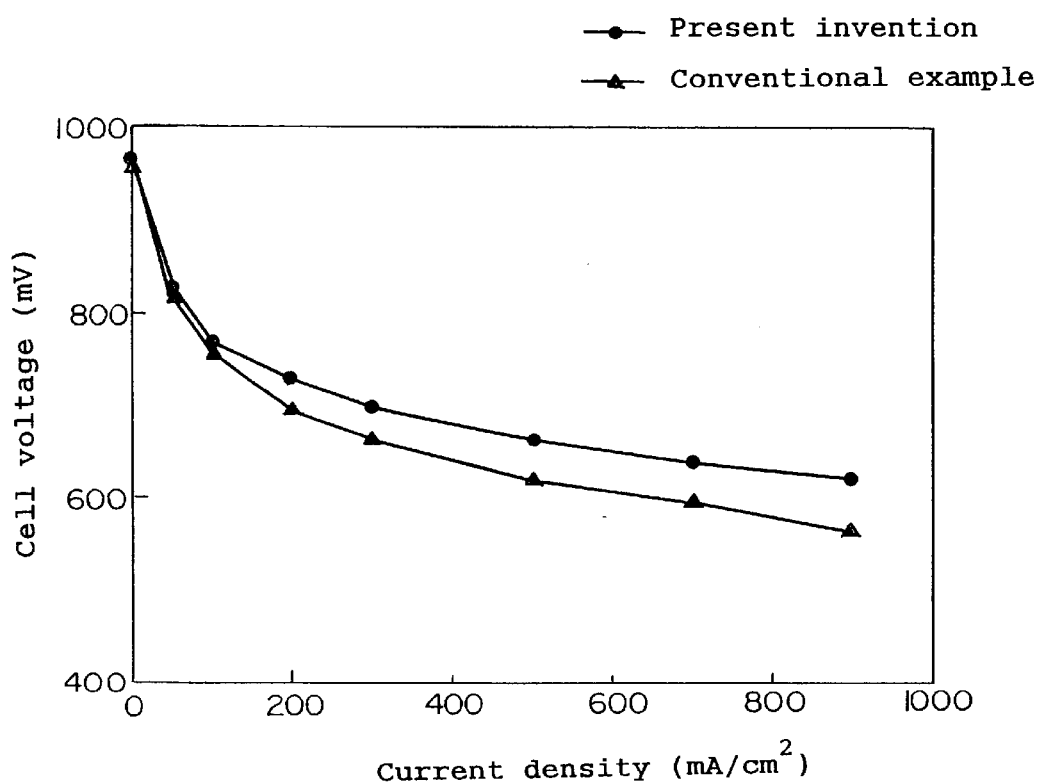
FIG. 4 is a graph showing the relation between the current and the voltage in a unit fuel cell according to Example 5 of the present invention.

In FIG. 4, it was confirmed that the cells D and E using the electrodes of the present invention exhibit high cell characteristics compared to Y of the comparative example.

Comparing the electrodes of the present invention and the conventionally proposed electrodes of the comparative example, the cells D and E have further improved characteristics than the cell Y despite that the amounts of polymer electrolyte and platinum catalyst contained in the electrodes are about the same, and the reason for this is considered that the silane compound having a basic functional group covered the catalyst carrier surface and formed a monomolecular layer, and this monomolecular layer further formed a minute polymer electrolyte layer in the vicinity of the catalyst carrier, which enabled further efficient hydrogen ion exchange.

Moreover, in Table 4, it was confirmed that the difference in the main chain skeleton of the silane compound influences the cell characteristics. That is to say, a cell comprising electrodes using a silane compound having a hydrocarbon chain with relatively weak hydrophobic property has especially a good effect when the operation current of the cell is low, and a cell comprising electrodes using a silane compound having a hydrogen fluoride with strong hydrophobic property has especially a good effect when the operation current of the cell is high.

In the above examples, the carbon powder serving as the catalyst carrier was subjected to surface treatment, however the constitution of the present invention can be used for the catalyst metal itself as long as it is a catalyst metal containing —OH group or oxide on the surface.

Fourth Embodiment

In order to solve the previously mentioned Problem (4), a fourth embodiment of the present invention has characteristics in electrodes in a fuel cell. That is to say, the fourth embodiment is a fuel cell comprising an membrane electrode assembly formed by laminating a hydrogen ion conductive polymer electrolyte membrane, a pair of electrodes sandwiching the above hydrogen ion conductive polymer electrolyte membrane and a pair of diffusion layers sandwiching the above electrodes, wherein the above electrodes include at least a catalyst comprising a hydrophilic carbon material with catalyst particles carried thereon, a hydrogen ion conductive polymer electrolyte and a water repellent carbon material.

It is preferable that a hydrophilic layer is chemically bonded to at least a part of the catalyst particle surface.

Further, it is preferable that the catalyst comprising a hydrophilic carbon material with catalyst particles carried thereon is selectively disposed on the hydrogen ion conductive polymer electrolyte membrane side, and the water repellent carbon material is selectively disposed on the gas diffusion layer side.

Moreover, it is preferable that the water repellent carbon material comprises a monomolecular layer formed by chemically bonding a silane coupling agent having a hydrophobic portion to a part of or entire surface of the carbon material.

It is preferable that also the hydrophilic carbon material comprises a layer formed by chemically bonding a silane coupling agent having a hydrophilic portion to a part of or entire surface of the carbon material.

It is preferable that the above carbon material is chemically bonded to the silane coupling agent through the intermediary of at least one functional group selected from among phenolic hydroxyl group, carboxyl group, lactone group, carbonyl group, quinone group, and anhydride carboxylic acid group.

Next, the present invention also relates to a production method of the above-mentioned electrodes. That is to say, the above electrodes can be produced by immersing at least one kind of catalyst particles or carbon material in a solvent containing a silane coupling agent thereby making the silane coupling agent chemically adsorbed onto at least a part of the catalyst particle surface or the carbon material surface, and subsequently chemically bonding the silicon atom in a molecule of the silane coupling agent to the catalyst particle surface or the carbon material surface.

As described above, in the electrodes for fuel cell according to the fourth embodiment of the present invention, since the catalytic reaction layer is constituted by a polymer electrolyte, a hydrophilic carbon material and a water repellent material, water is adequately retained by the hydrophilic carbon material in the vicinity of the three phase zone where the electrode reaction occurs, and water generated in excess is promptly discharged by the adjacent water repellent carbon material.

For this reason, even when the fuel cell is operated at a relatively low current density, the electrodes retain a certain water retention capacity because of the hydrophilic carbon material, and thus high characteristics can be expected. On the other hand, when the fuel cell is operated at a relatively high current density, excess generated water is promptly discharged by the water repellent carbon material disposed in the very vicinity of the hydrophilic carbon material, therefore flooding phenomenon does not readily occur, and thus the cell performance is improved.

Further, when the hydrophilic carbon material is placed on the polymer electrolyte membrane side and the water repellent material is placed on the gas diffusion layer side, the polymer electrolyte membrane side is under higher-humidified atmosphere, which improves ion conductivity of the polymer electrolyte membrane and improves the cell characteristics.

Moreover, in the electrodes for fuel cell according to this embodiment, hydrolyzable group of the silane coupling agent having a hydrophobic portion is hydrolyzed on the surface of the carbon particles by water in the solvent or in the air, or water adsorbed on the carbon surface. It is, then, converted into active silanol group ($\equiv$SiOH), and reacts with functional group on the carbon surface to form a strong bond. As a consequence, a microscopic monomolecular water repellent layer of several nm to several tens of nm is formed on the carbon particle surface. When using the above water repellent carbon particles, even when the electrodes are configured by mixing the same with the hydrophilic catalyst carrying carbon particles, there occurs no inhibition of the reaction gas supply due to the catalyst particles in the electrodes being coated, which is the case in which PTFE dispersion particles of submicron order are used.

Still further, in the fuel cell according to the present invention, on the catalyst particle surface or the surface of the carbon particles with the catalyst carried thereon, hydrolyzable group of the silane coupling agent is hydrolyzed by water in the solvent or in the air, or water adsorbed onto the carbon surface in the same manner as previously. Then, it is converted into active silanol group ($\equiv$SiOH) and reacts with functional group on the carbon surface to form a strong bond. By making this silane coupling agent contain a hydrophilic group such as sulfonic acid group, carboxyl group and the like, the catalyst surface is made hydrophilic and the moist condition around the three-phase zone is maintained.

As described above, by using the electrodes according to this embodiment, a polymer electrolyte fuel cell exhibiting a higher performance compared to the conventional ones because appropriate moist condition is maintained by the hydrophilic catalyst carrying carbon particles around the three-phase zone where the electrode reaction occurs, and also excess generated water is promptly discharged by the adjacent water repellent carbon.

Examples of the fourth embodiment of the present invention will be described below.

EXAMPLE 14

Figure 16:
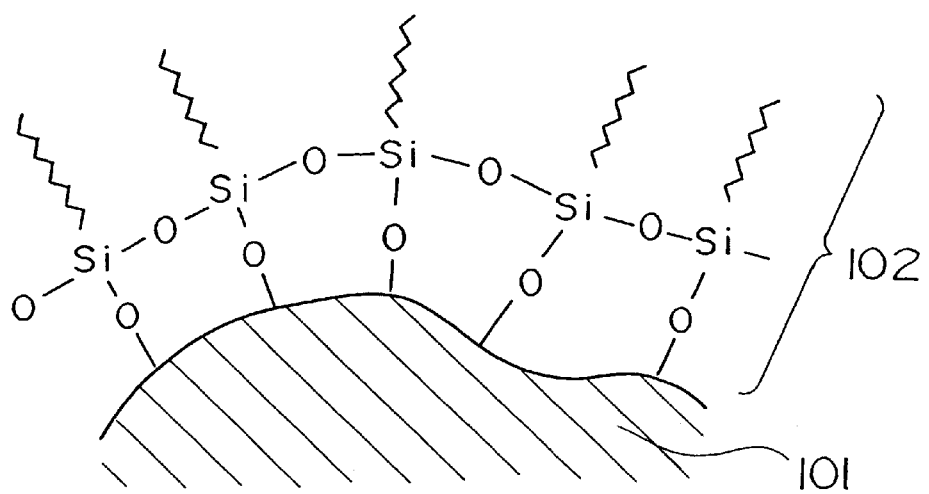
FIG. 16 is a schematic view conceptually showing the state of the surface of the carbon particle used in Example 14 of the present invention.

First, a production method of the water repellent carbon material will be described. A monomolecular layer comprising a silane coupling agent was formed by making the entire surface of the carbon powder adsorb directly a silane coupling agent by chemical adsorption under a nitrogen gas atmosphere. As the silane coupling agent, $CH_3$—$(CH_2)n$-$SiCl_3$ (n is an integer of 10 to 25) which contains a linear hydrocarbon chain was used, and a hexane solvent dissolving the same at 1% by weight was prepared and the above carbon particles were immersed therein. The carbon particles used at this time were a graphitizable carbon with a phenolic hydroxyl group and a carboxyl group remaining on the surface thereof, and a monomolecular water repellent layer comprising the silane coupling agent was formed by subjecting these functional groups and —$SiCl_3$ of the silane coupling agent to hydrochloric acid elimination reaction. FIG. 16 shows this state.

In FIG. 16, 101 is a carbon particle and 102 is a monomolecular water repellent layer. The thickness of the monomolecular water repellent layer 102 was about 2 to 10 nm. At this time, by changing the molecular weight of the monomolecular, the membrane thickness of the same could be made 1 to 100 nm. Further, as the material for chemical adsorption, it is not restricted to the silane base surfactant used in this example as long as it contains group capable of bonding with —OH group such as $\equiv$SiCl group and the like.

Next, a hydrophilic carbon powder with platinum carried thereon at 25% by weight, which serves as an electrode catalyst, and the above water repellent carbon material were mixed, to which a solution dispersing a polyfluorocarbon type polymer electrolyte containing pendant —$SO_3H$ group (FSS-1, manufactured by Asahi Grass Co., Ltd.) and butanol were added to prepare an ink. After this ink was applied onto a carbon paper (TGP-H-120, manufactured by Toray Industries, Inc., film thickness of 360 $\mu$m) by the screen printing process, butanol was eliminated by heating and drying, thereby to produce an electrode A' of the present example.

In the above process, the platinum carrying carbon powder used was a hydrophilic one having many surface functional groups (VulcanXC72R, manufactured by Cabot). Also, the platinum amount per unit area was made 0.5 mg/cm$^2$. Further, the mixing ratio of the platinum carrying hydrophilic carbon powder, water repellent carbon material and polyfluorocarbon type polymer electrolyte was 100:20:3 after preparation.

Next, an electrode B' for comparison was produced. The electrode B' for comparison was one produced by forming a noble metal carrying carbon powder serving as the catalyst and a water repellent agent on a porous electroconductive electrode supporting material serving as the gas diffusion layer, as a conventionally proposed constitution. As the porous electroconductive electrode material, the same carbon paper used for the electrode A' above (TGP-H-120, manufactured by Toray Industries, Inc., film thickness of 360 $\mu$m) was used, and this was primarily subjected to water repellency treatment by using a solution dispersing a polyfluorocarbon type polymer electrolyte containing pendant —$SO_3H$ group (FSS-1, manufactured by Asahi Glass Co., Ltd.). In the above constitution, the carbon powder used was a water repellent one having a few surface functional groups (Denka Black, manufactured by DENKI KAGAKU KOGYO KABUSHIKI KAISHA). Also, as the water repellency agent, a solution dispersing a polyfluorocarbon type polymer electrolyte containing pendant —$SO_3H$ group (FSS-1, manufactured by Asahi Glass Co., Ltd.) was used. Apart from this, the constitution was made the same as the electrode A' above.

The respective electrode A' of this example thus produced and the electrode B' of the comparative example were disposed on both sides of respective polymer electrolyte membranes (Nafion 112, manufactured by Du Pont), and these were hot-pressed to produce membrane electrode assemblies. These were set in unit cell measuring devices as shown in FIG. 11 to configure unit cells. In FIG. 11, numerals 20, 24 and 25 denote the membrane electrode assembly mentioned above.

In these unit cells, hydrogen and air were supplied to the fuel electrode and the air electrode, respectively, and they were adjusted to have a cell temperature of 75° C., a fuel utilization rate of 80%, an air utilization of 30%, and gas humidification so that hydrogen gas and air had their dew points of 75° C. and 65° C., respectively. The current-voltage characteristics of the battery at this time are shown in FIG. 17.

Figure 17:
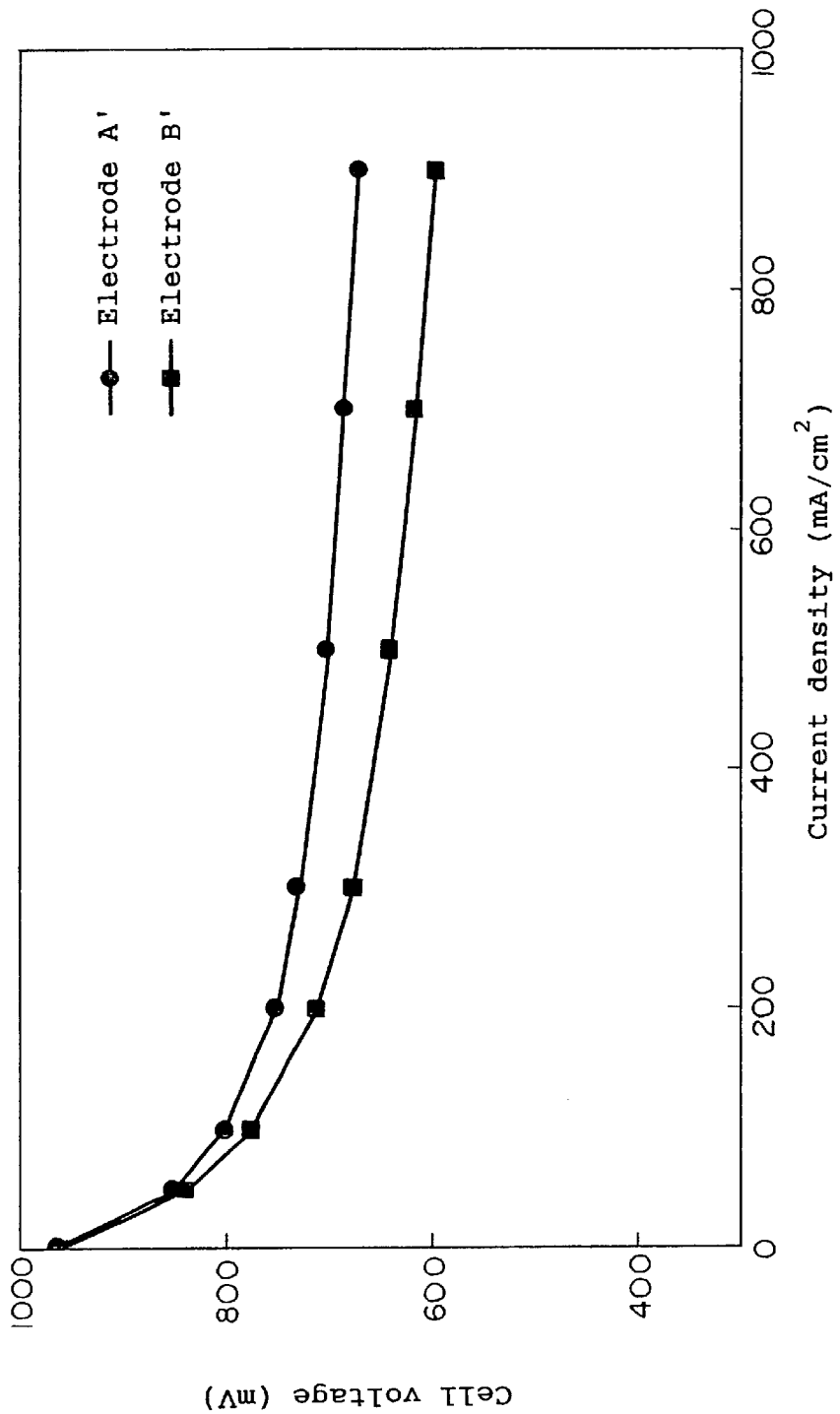
FIG. 17 is a graph showing the relation between the current and the voltage of a fuel cell obtained in Example 14 of the present invention.

In FIG. 17, it was confirmed that the cell using the electrode A' of this example exhibits better characteristics than the one using the electrode B' with the conventionally proposed constitution. The reason for this is considered that, when a water repellent carbon powder treated with a silane coupling agent is used, there occurs no inhibition of the reaction gas supply due to the catalyst fine particles in the electrode being coated, which is the case in which PTFE carrying carbon powder with PTFE dispersion particles of submicron order is used.

EXAMPLE 15

Figure 18:
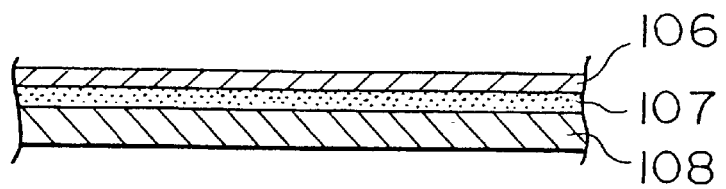
FIG. 18 is a schematic cross sectional view showing an electrode in Example 15 of the present invention.

In this example, electrodes were produced by placing the catalytic reaction layer on the polymer electrolyte side and the water repellent carbon particles on the gas diffusion layer side, and the characteristics thereof were evaluated. First of all, the catalyst carrying carbon powder and the water repellent carbon powder treated with the silane coupling agent as shown in Example 14 were prepared into separate inks and were applied to form the electrodes. This is shown in FIG. 18. First, a water repellent carbon powder (Denka Black, manufactured by DENKI KAGAKU KOGYO KABUSHIKI KAISHA) was prepared into an ink using butanol, and this was screen-printed on a carbon paper (TGP-H-120, manufactured by Toray Industries, Inc., film thickness of 360 μm). After this was dried, a catalyst carrying carbon powder 106 was prepared into an ink by using a solution dispersing a polyfluorocarbon type polymer electrolyte with pendant —$SO_3H$ group (FSS-1, manufactured by Asahi Glass Co., Ltd.) and butanol, and this ink was applied onto the above carbon paper 108 coated with the above water repellent carbon powder 107 by the screen printing process, thereby producing electrodes.

By using the electrodes thus produced, a membrane electrode assembly was prepared and a unit cell as shown in FIG. 11 was configured in the same manner as in Example 14. The cell voltage when a current of 700 mA/$cm^2$ was applied is shown in Table 5. Table 5 also shows the characteristics of the cells with the electrode A' and the electrode B' prepared in Example 14 above.

TABLE 5

|  | Cell voltage (mV) |
| --- | --- |
| Example 15 | 710 |
| Electrode A' | 690 |
| Electrode B' | 620 |

From Table 5, it is found that, by using the electrodes with the electrode catalyst layer disposed on the polymer electrolyte membrane side and the water repellent carbon particles disposed on the gas diffusion layer side, as employed in Example 15, the equal characteristics can be obtained as the one using the carbon powder treated with a silane coupling agent in Example 14. From this, it is found that a cell with further excellent characteristics can be configured by using electrodes with an electrode catalyst layer disposed on the polymer electrolyte membrane side and a water repellent carbon particles on the gas diffusion layer side.

EXAMPLE 16

Figure 19:
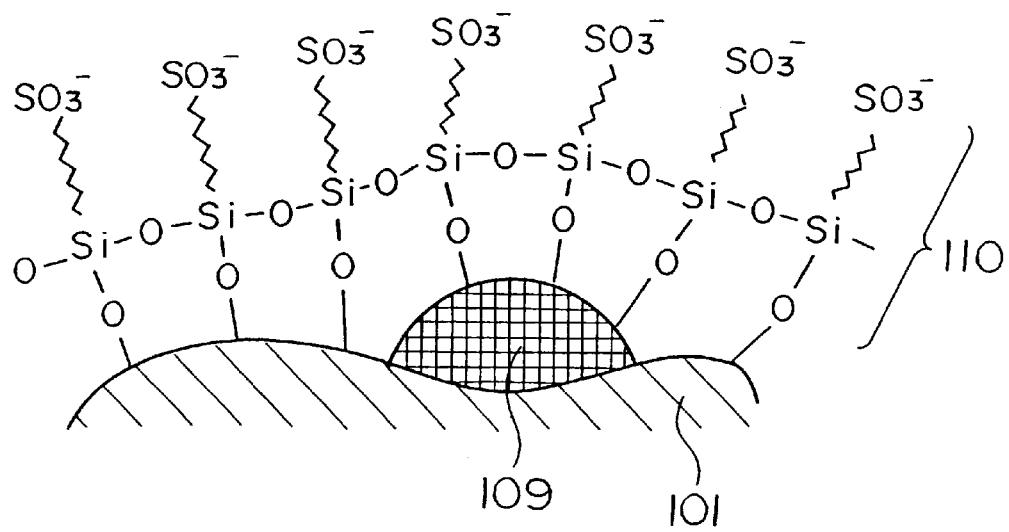
FIG. 19 is a schematic view conceptually showing the state of the surface of the catalyst carrying carbon particle used in Example 16 of the present invention.

Next, the case in which the catalyst carrying carbon powder was treated with a silane coupling agent was described referring to FIG. 19. By using the platinum carrying carbon powder used in Example 14 and $ClSO_2$—$(CH_2)n$-$(CF_2)m$-$SiCl_3$ (n and m are integers of 10 to 25) having a hydrocarbon chain and a fluorocarbon chain in the main chain and having sulfonic acid group at the end in place of the silane coupling agent used in Example 14, a monomolecular film 110 having sulfonic acid group on the respective surfaces of platinum particles 109 and carbon particles 101 was formed. This monomolecular layer is hydrophilic because of having sulfonic acid group at the end. Also, the silane coupling agent is not restricted to the silane base surfactant as described in the example as long as it contains a hydrophilic portion.

By mixing the platinum carrying carbon powder thus subjected to hydrophilic treatment and the water repellent powder treated with the silane coupling agent used in Example 14, electrodes were prepared in the same manner as in Example 14 and a unit cell as shown in FIG. 11 was produced by using the same.

When the characteristics of the cell were evaluated under the same conditions as in Example 14, the voltage at the current density of 700 mA/$cm^2$ was 720 mV. This is a higher characteristic than the cell prepared in Example 14, and the reason for this is considered that wet property around the three phase zone was improved by subjecting the catalyst fine particle carrying carbon powder to water repellency treatment with the silane coupling agent.

In the present invention, a chlorosilane type surfactant having sulfonic acid group was used as the silane coupling agent, however any type of agents, as long as they have a hydrophilic portion, for example those having carboxyl group and the like, can be used. Also, in this case, both of the catalyst fine particles and the carbon particles were treated, however only one of them may be treated as long as they are applicable in the present invention. Further, the carbon powder and the catalyst carrying carbon powder used are not restricted to the ones used in this example as long as they are applicable in the present invention.

INDUSTRIAL APPLICABILITY

As apparent from the first embodiment of the present invention, in the fuel cell of the present invention, a higher cell performance can be achieved with the same platinum amount, and for obtaining an equal cell performance, the platinum amount used can be greatly reduced.

According to the second embodiment of the present invention, in the fuel cell of the present invention, a layer comprising electroconductive fine particles is disposed between the catalytic reaction layer and the gas diffusion layer, which decreases the contact resistance between the catalytic reaction layer and the gas diffusion layer, thereby improving the cell characteristics. Also, if the layer comprising electroconductive fine particles penetrates partially into the gas diffusion layer, the effect thereby is further improved. Further, since the catalytic reaction layer never penetrates into the gas diffusion layer, the amount used of the noble metal catalyst for use in the catalytic reaction layer can be reduced more than conventionally, and thus a cost reduction effect can be expected. Still further, if a carbon material comprising an electroconductive fine particle layer with PTFE adhered thereon is used, there is an advantage that the physical bonding property between the catalytic reaction layer and the gas diffusion layer is increased, which facilitates handling. Moreover, in this case, a secondary effect can be expected that since PTFE is introduced, a part of water generated in the air electrode can be taken into the electrolyte membrane and excess generated water can be discharged to the gas diffusion layer side. In this manner, since the electroconductive fine particle layer is disposed between the catalytic reaction layer and the gas diffusion layer in the fuel cell of the present invention, the fuel cell with higher performance than conventional ones can be configured.

The electrodes for fuel cell according to the third embodiment of the present invention are characterized in that the surface of the catalyst particles or catalyst carrier has hydrogen ion diffusion function, and has a functional polymer adsorbed thereon. As a consequence, a monomolecular polymer electrolyte layer can be uniformly adsorbed on the catalyst metal surface or the carbon surface with catalyst carried thereon, and a hydrogen ion channel can be formed in the catalyst inside the micropores. As a result, the reaction surface area is enlarged, which permits realization of a polymer electrolyte fuel cell exhibiting a higher discharge performance.

Also, the hydrophilicity of this polymer layer can be increased by making a silane compound have a hydrocarbon chain, and thus the electrodes can maintain a certain water retention capacity and high performance can be obtained even when the fuel cell is operated at a low current density and little water generates, or the fuel cell is operated in a low-humidified air.

Further, the water repellency of the polymer layer can be increased by making it have a fluorocarbon chain, and the gas diffusion ability of the electrodes can be improved and a high performance can be obtained even when the fuel cell is operated at a high current density and a large quantity of water generates, or when the fuel cell is operated in high-humidified air.

Still further, there is an advantage that, since the reaction surface area is enlarged, the amount used of the noble metal catalyst for use in the electrode catalyst layer can be reduced more than conventional ones, and thus a cost reduction effect can be expected.

Moreover, the electrodes of the present invention are characterized in that functional polymer having hydrogen ion diffusion function is adsorbed on the surface of the catalyst particles or the catalyst carrier. This functional polymer functions as a polymer electrolyte layer. A silane compound having basic functional group is used to form this, and a monomolecular layer is formed as the functional polymer. In this manner, by modifying the catalyst surface with the functional polymer having hydrogen ion surface diffusion function, a minute polymer electrolyte layer is formed close to the catalyst, and efficient hydrogen ion channel and a gas channel are formed. As a result, a polymer electrolyte fuel cell exhibiting a high discharge performance can be realized.

Furthermore, by utilizing highly efficient hydrogen ion exchange ability, the noble metal catalyst amount used for the catalytic reaction layer can be reduced without deteriorating the discharge characteristics, and thereby a cost reduction is made possible.

Still further, by selecting the skeleton structure of the silane compound modifying the surface, wet property of the electrodes can be controlled. As a consequence, the electrode catalyst that is the most suitable for the operation conditions of the fuel cell can be prepared.

As apparent from the fourth embodiment of the present invention, in the fuel cell according to the present invention, since the catalytic reaction layer is constituted by a polymer electrolyte, hydrophilic catalyst carrying carbon particles and water repellent carbon particles, appropriate moisture condition is maintained by the hydrophilic catalyst carrying carbon particles around the three-phase zone where the electrode reaction occurs, and water generated in excess is promptly discharged by the adjacent water repellent carbon.

Also, when the hydrophilic catalyst carrying carbon particles are disposed on the polymer electrolyte membrane side and the water repellent carbon particles are disposed on the gas diffusion layer side, the polymer electrolyte membrane side is under highly humidified atmosphere, which improves ion conductivity of the polymer electrolyte membrane to improve the cell characteristics.

Further, in the fuel cell of the present invention, on the carbon particle surface, a hydrolyzable group of the silane coupling agent having a hydrophobic portion is hydrolyzed by water in the solution or in the air or water adsorbed on the carbon surface, and it is converted into an active silanol group ($\equiv$SiOH) and reacts with functional group on the carbon surface to form a strong bond. As a consequence, a microscopic water repellent monomolecular layer of several nm to several tens of nm is formed. When the above water repellent carbon particles are used, even if the electrodes are configured in mixing with hydrophilic catalyst carrying carbon particles, there occurs no inhibition of the reaction gas supply due to the catalyst fine particles in the electrodes being coated, which is the case in which PTFE dispersion particles of submicron order are used.

Still further, in the fuel cell of the present invention, on the catalyst particle surface or the catalyst carrying carbon particle surface, hydrolyzable group of the silane coupling agent is hydrolyzed, in the same manner as above, by water in the solution or in the air or water adsorbed on the carbon surface, and it is converted into active silanol group ($\equiv$SiOH) and reacts with functional group on the carbon surface to form a strong bond. By making this silane coupling agent have a hydrophilic group such as sulfonic acid group, carboxyl group or the like, the catalyst surface is rendered hydrophilic, and thereby moisture condition around the three-phase zone is maintained.

As described above, by using the electrodes according to the fourth embodiment of the present invention, appropriate moisture condition around the three-phase zone where the electrode reaction occurs is maintained, and excess generated water is promptly discharged by the adjacent water repellent carbon, therefore a polymer electrolyte fuel cell exhibiting higher performance than conventional ones can be configured.

What is claimed is:

1. A polymer electrolyte fuel cell, comprising:
    a polymer electrolyte membrane and a pair of electrodes, each electrode having a catalytic reaction layer, a gas diffusion layer and an intermediate layer between the catalytic reaction layer and the gas diffusion layer, the pair of electrodes being disposed on opposite sides of the polymer electrolyte membrane,
    wherein the intermediate layer comprises electroconductive fine particles and the composition of the electroconductive fine particles is different in the respective intermediate layers on the opposite sides of the polymer electrolyte membrane.

2. The polymer electrolyte fuel cell according to claim 1, wherein a part of the intermediate layer penetrates into the respective gas diffusion layer.

3. The polymer electrolyte fuel cell according to claim 1, wherein the electroconductive fine particles have an average primary particle diameter of 10 to 100 nm.

4. The polymer electrolyte fuel cell according to claim 1, wherein the composition of the electroconductive fine particles is selected from the group consisting of carbon, metal, carbon-polymer composite, metal-polymer composite, and mixtures thereof.

5. The polymer electrolyte fuel cell according to claim 1, wherein the electroconductive fine particles comprise carbon powder with PTFE adhered thereto, and the composition of the electroconductive fine particles is different in the respective intermediate layers in that a ratio of carbon powder to PTFE in the particles is different.

6. The polymer electrolyte fuel cell according to claim 5, wherein the intermediate layer has a PTFE content in a range of 5 to 75% by weight.

7. A membrane electrode assembly (MEA) for a fuel cell, comprising:
    a polymer electrolyte membrane and a pair of electrodes, each electrode having a catalytic reaction layer, a gas diffusion layer and an intermediate layer between the catalytic reaction layer and the gas diffusion layer, the pair of electrodes being disposed on opposite sides of the polymer electrolyte membrane, wherein the intermediate layer comprises electroconductive fine particles and the composition of the electroconductive fine particles is different in the respective intermediate layers on the opposite sides of the polymer electrolyte membrane.

8. The membrane electrode assembly according to claim 7, wherein a part of the intermediate layer penetrates into the respective gas diffusion layer.

9. The membrane electrode assembly according to claim 7, wherein the electroconductive fine particles have an average primary particle diameter of 10 to 100 nm.

10. The membrane electrode assembly according to claim 7, wherein the composition of the electroconductive fine particles is selected from the group consisting of carbon, metal, carbon-polymer composite, metal-polymer composite, and mixtures thereof.

11. The membrane electrode assembly according to claim 3, wherein the electroconductive fine particles comprise carbon powder with PTFE adhered thereto, and the composition of the electroconductive fine particles is different in the respective intermediate layers in that a ratio of carbon powder to PTFE in the particles is different.

12. The membrane electrode assembly according to claim 11, wherein the intermediate layer has a PTFE content in a range of 5 to 75% by weight.

* * * * *

UNITED STATES PATENT AND TRADEMARK OFFICE
CERTIFICATE OF CORRECTION

PATENT NO.   : 6,746,793 B1
DATED        : June 8, 2004
INVENTOR(S)  : Hisaaki Gyoten et al.

It is certified that error appears in the above-identified patent and that said Letters Patent is hereby corrected as shown below:

Column 32,
Lines 4 and 5, "claim 3" should read -- claim 7 --

Signed and Sealed this

Fifteenth Day of February, 2005

JON W. DUDAS
*Director of the United States Patent and Trademark Office*